(12) United States Patent
Traxl

(10) Patent No.: US 12,403,341 B2
(45) Date of Patent: Sep. 2, 2025

(54) DRILL FIRE EXTINGUISHING DEVICE AND DRILL FIRE EXTINGUISHING SYSTEM, DRILL BIT

(71) Applicants: PUTZ INNOVA GmbH, Bad Goisern (AT); Lukas Traxl, Ebensee (AT)

(72) Inventor: Lukas Traxl, Ebensee (AT)

(73) Assignees: Putz Innova GmbH, Bad Goisen (AT); Lukas Traxl, Ebensee (AT)

( * ) Notice: Subject to any disclaimer, the term of this patent is extended or adjusted under 35 U.S.C. 154(b) by 601 days.

(21) Appl. No.: 17/762,787

(22) PCT Filed: Sep. 23, 2020

(86) PCT No.: PCT/EP2020/076607
§ 371 (c)(1),
(2) Date: Mar. 23, 2022

(87) PCT Pub. No.: WO2021/058590
PCT Pub. Date: Apr. 1, 2021

(65) Prior Publication Data
US 2023/0001246 A1   Jan. 5, 2023

(30) Foreign Application Priority Data
Sep. 24, 2019  (DE) .................. 10 2019 125 685.2

(51) Int. Cl.
*A62C 31/22*  (2006.01)
*B23B 45/04*  (2006.01)

(52) U.S. Cl.
CPC ............ *A62C 31/22* (2013.01); *B23B 45/042* (2013.01); *B23B 2270/025* (2013.01)

(58) Field of Classification Search
CPC .. A62C 31/22; B23B 45/042; B23B 2270/025
(Continued)

(56) References Cited

U.S. PATENT DOCUMENTS 3,865,194 A    2/1975  Chatfield, Jr.
4,271,909 A *  6/1981  Chatfield, Jr. ......... A62C 31/22
                                              175/170
(Continued)

FOREIGN PATENT DOCUMENTS

CA      1144843      4/1983
DE      2950196      3/1980
DE    202007012315   1/2009

OTHER PUBLICATIONS

International Search Report for PCT/EP2020/076607.
(Continued)

*Primary Examiner* — Arthur O. Hall
*Assistant Examiner* — Juan C Barrera
(74) *Attorney, Agent, or Firm* — Maxwell J. Petersen; FisherBroyles, LLP

(57) ABSTRACT

The invention relates to a drill fire extinguishing device (1) having:
 a tool holder (13) to hold or be connected to a tool;
 a fluid connection to supply a fluid;
 a turbine with an impeller that has at least one stage with a plurality of runner blades connected to the tool holder (13) to drive it in a rotary and/or percussive fashion using drive fluid via the fluid connection.
The drill fire extinguishing device (1) also has:
 at least one discharge opening (20) in a stationary wall (4) of the drill fire extinguishing device (1) communicating with a fluid chamber and/or
 a nozzle assembly (12) with one or more nozzles (18) in a stationary wall (4) of the drill fire extinguishing device (1) for dispensing the fluid and communicating with the fluid chamber.
The invention also relates to a drill fire extinguishing system and a drill bit.

22 Claims, 13 Drawing Sheets

(58) Field of Classification Search
USPC .......... 169/70; 239/271, 272, 595, 380, 381
See application file for complete search history.

(56) References Cited

U.S. PATENT DOCUMENTS

| | | | | |
|---|---|---|---|---|
| 5,822,968 | A * | 10/1998 | Savala | B05B 9/0822 |
| | | | | 239/289 |
| 5,913,367 | A * | 6/1999 | Hampton | A62C 31/22 |
| | | | | 169/70 |
| 6,578,777 | B2 * | 6/2003 | Bui | B05B 7/0475 |
| | | | | 239/406 |
| 9,687,685 | B1 * | 6/2017 | Chmielewski | A62C 31/12 |
| 2006/0273194 | A1 * | 12/2006 | Kapich | B05B 3/0427 |
| | | | | 239/222 |
| 2019/0344108 | A1 * | 11/2019 | Rosenfeldt | B66F 11/042 |
| 2020/0197960 | A1 * | 6/2020 | Zhang | B05B 1/1636 |

OTHER PUBLICATIONS

English Translation of German Office Action for DE 10 2019 125 685.2, dated Apr. 26, 2021.
English Translation of Written Opinion for PCT/EP2020/076607 (Written Decision of International Search Authority).

* cited by examiner

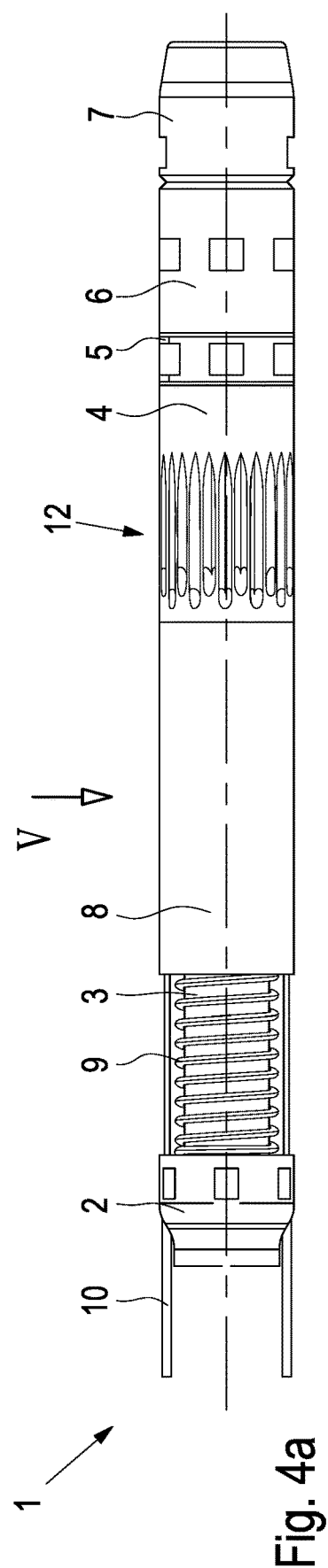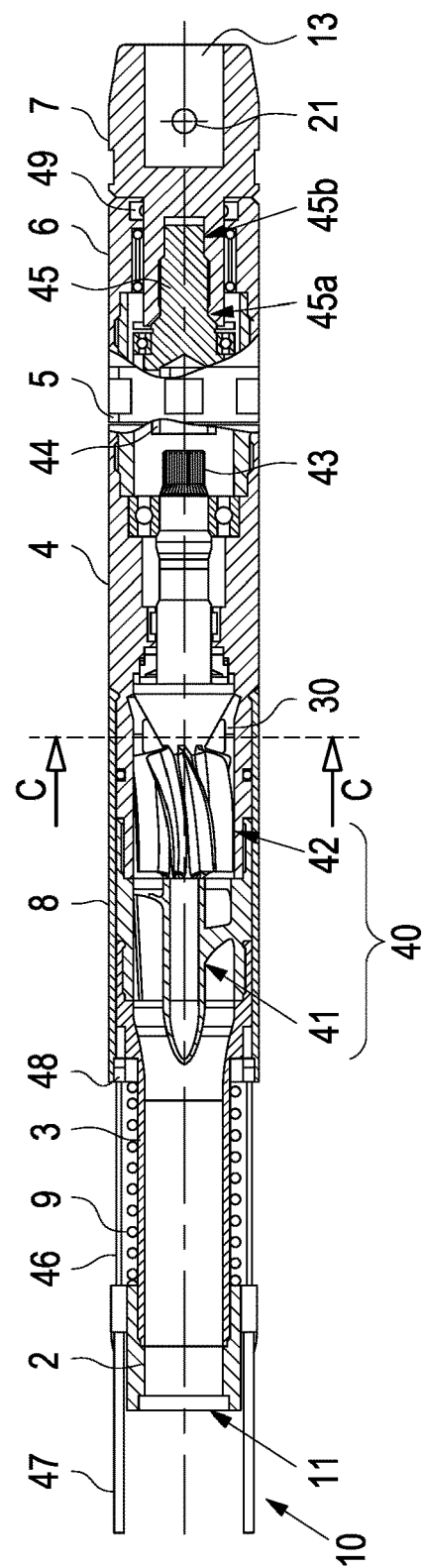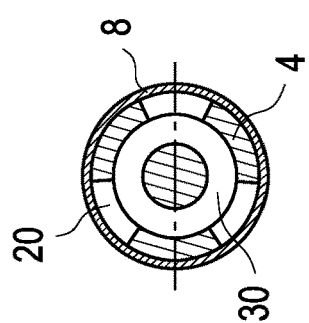
Fig. 4a
Fig. 4b
Fig. 4c

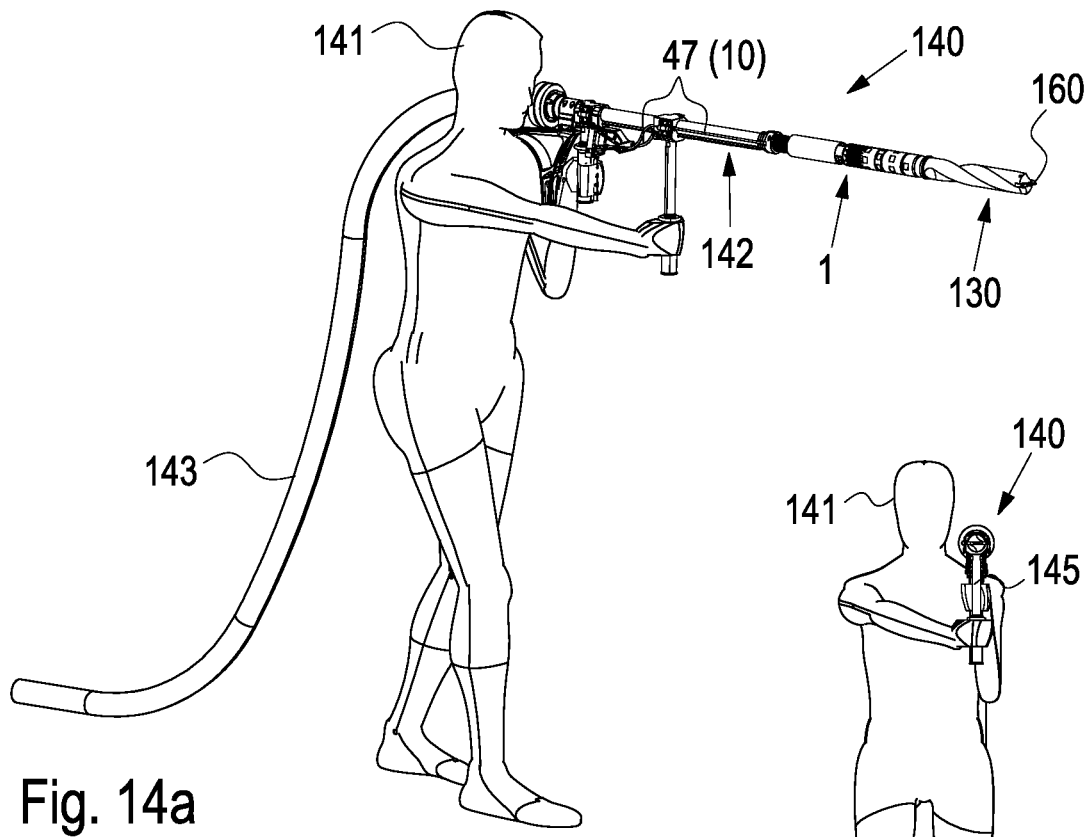
Fig. 14a
Fig. 14b
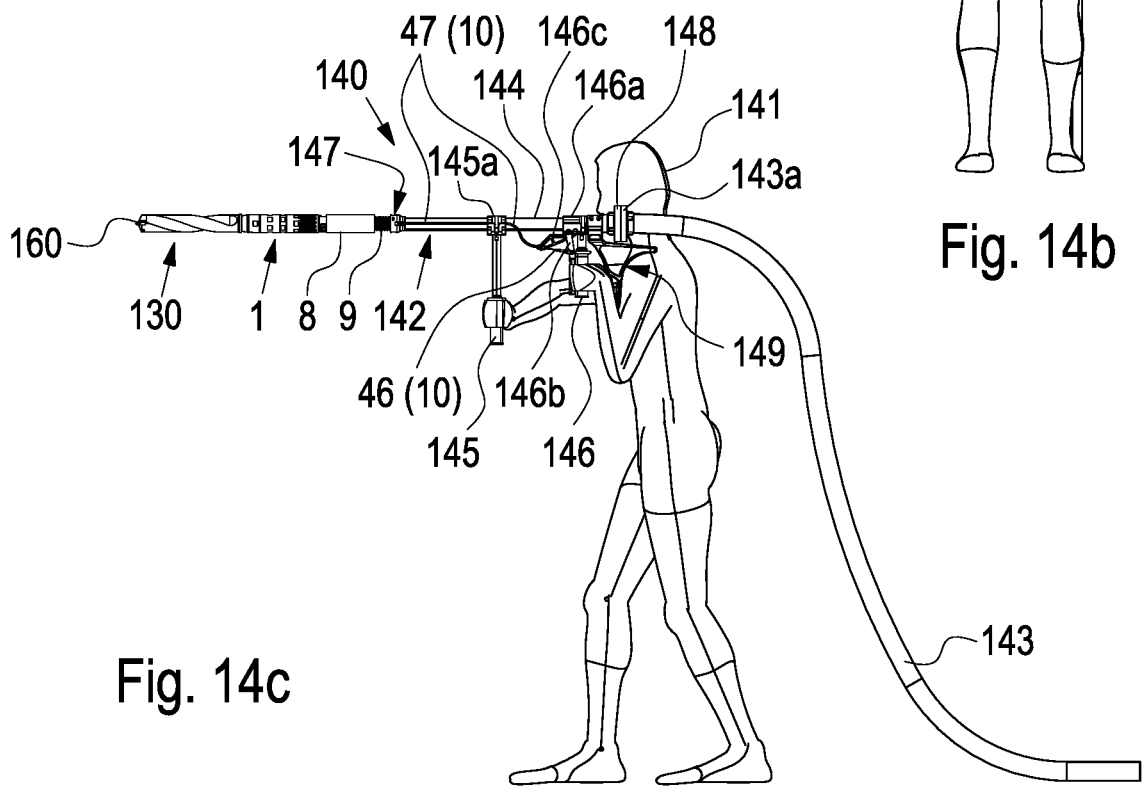
Fig. 14c

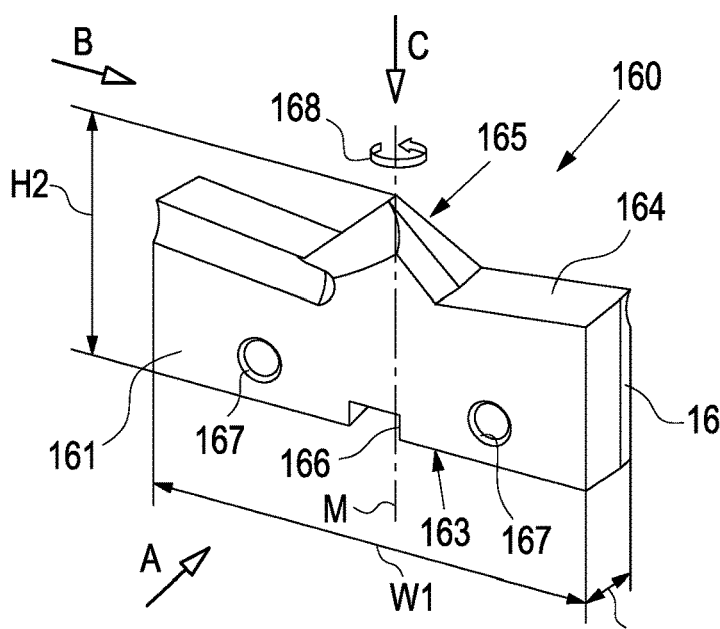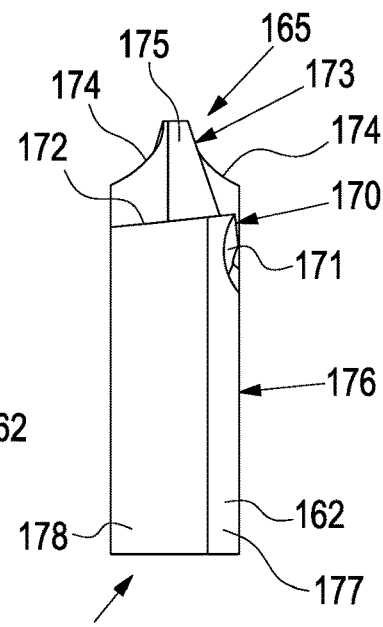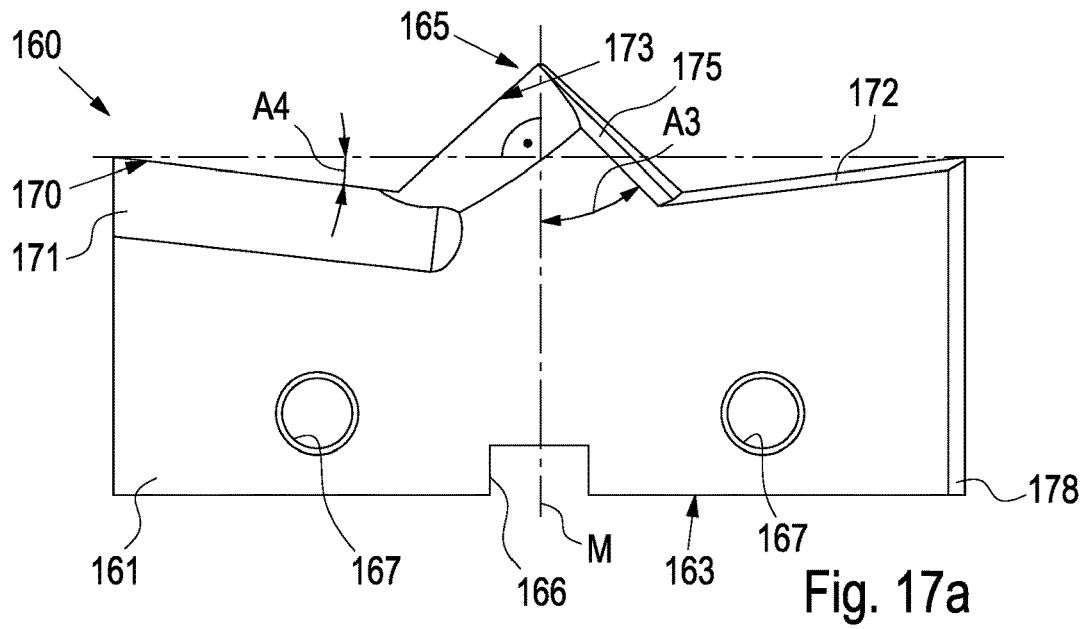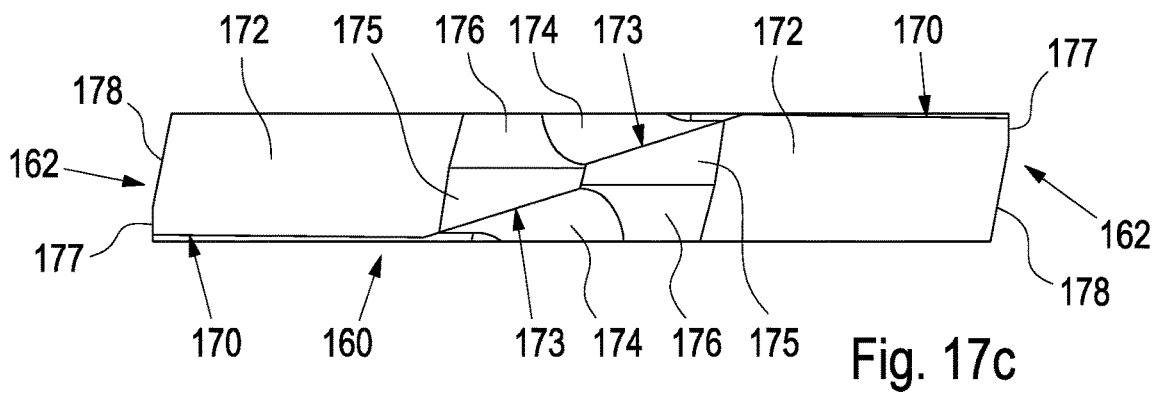
Fig. 16
Fig. 17b
Fig. 17a
Fig. 17c

DRILL FIRE EXTINGUISHING DEVICE AND DRILL FIRE EXTINGUISHING SYSTEM, DRILL BIT

RELATED APPLICATIONS

This patent application is a 35 U.S.C. § 371 National Stage entry based on and claiming priority to International Application PCT/EP2020/076607, filed on Sep. 23, 2020, which in turn claims priority based on German Patent Application DE 10 2019 125 685.2. filed on Sep. 24, 2019, the disclosures of which are incorporated herein by reference in their entireties.

FIELD OF THE INVENTION

The present invention relates to a drill fire extinguishing device and a drill fire extinguishing system as well as a drill bit.

BACKGROUND OF THE INVENTION

In firefighting applications, there are situations in which currently available equipment cannot guarantee optimal use. On the one hand, fires may have reached the so-called "flashover" situation before emergency personnel arrive. This means that due to heat build-up and the resulting emission of gases by materials, the fire can spread throughout the space. The fire load is often so high that an inside attack can no longer be carried out without high risks. On the other hand, in the same situation, there can be a prevailing lack of air; the result of this is a rich smoke/gas mixture that tends to suddenly explode when supplied with air. This supply of air is often brought about by firefighters themselves, which in the past has resulted in accidents with grave consequences.

The often difficult thermal situation is exacerbated by structural conditions such that the medium does not reach the source of the fire at all. As a result conventional methods often cause only water damage while the fire extinguishing medium does not reach the source of the fire at all. A forcible opening or destruction of the building structure is thus usually the result, which is carried out with enormous effort and risk through a prolonged operation of heavy equipment and high manpower requirements. A good example of this is fires in a suspended ceiling; although they start out very small, because of the difficulty of access, they have in the past resulted in major conflagrations with massive damage.

In addition, with fires in the logistics field, there is the problem that hazardous and often unknown substances in shipping containers can catch fire and when the container is opened, can engulf firefighters and often spread suddenly.

Prior solutions cope with this problem only to an insufficient degree.

U.S. Pat. No. 3,865,194 describes a drill fire extinguishing device. A housing accommodates a tangential flow turbine with a comparatively large wheel diameter and cup-shaped blades, which drives a hollow drill shaft on the output end via a spur gear step-down transmission. On the output end, the drill shaft is fastened by means of a bayonet connector to an adapter that holds a drill bit at a drilling end by means of a screw connection. The adapter has a ring of axially parallel bores that communicate with the hollow section of the drill shaft, bend obliquely outward toward the drilling end, and open in a shoulder face of the adapter toward the drilling end. The hollow section of the drill shaft in turn communicates via lateral slots with an annular chamber, which is contained in the shared housing of the turbine, the step-down transmission, and the drill shaft bearing. By means of a plug valve, a fluid, in particular fire-extinguishing water, can be supplied to the turbine, to the annular chamber, or partially to both. During operation, the turbine can first be supplied with fire-extinguishing water in order to drive the drill shaft via the step-down transmission to drill a hole in an obstacle with the drill bit. Then, without setting down the device, the adapter can be pushed further through the borehole in the obstacle and by means of the plug valve, the fluid can be partially or fully supplied to the annular chamber from which it finds its way to the bores in the adapter and comes out from the openings as a funnel-shaped jet. In this way, a space behind the obstacle can be supplied with fire-extinguishing water. If a part of the fluid is still conveyed to the turbine, then the funnel-shaped jet also rotates, which makes it possible to achieve a wider distribution of the fire-extinguishing water. Another valve device upstream of the plug valve can be used to add another fluid such as carbon dioxide to the fire-extinguishing water.

This previously known drill fire extinguishing device is comparatively large and heavy and is therefore difficult to transport in fire situations and cumbersome to use. The supply of the fire-extinguishing water by means of rotating parts requires a considerable expense for the seal, which is exposed to high mechanical and thermal stresses and is not always reliable. U.S. Pat. No. 9,630,038 B2 discloses a drill fire extinguishing device with a water turbine for driving a drill bit via a reversing gearbox. The drill bit is hollow, is provided with spraying and diffusing pores at its tip, and can be connected via an adapter sleeve to a bypass flow of the drive fluid for the water turbine. The drill bit can be adapted for particular type of material of an obstacle (carbon steel drill bits for iron and steel, diamond drill bits for glass, or diamond core drills for concrete) or can be a multi-purpose bit for several types of material. In addition to the above-mentioned problems such as supplying the fire-extinguishing water via rotating parts, this device also has the disadvantage that the fire-extinguishing water is conveyed via an expendable part, namely the drill bit, which further increases the production complexity and the running costs. The geometry of the pores can be changed by the drilling procedure or resharpening and the pores can become clogged with drilling dust. A practical design of this device is not known.

DE 101 52 757 A1 has disclosed a puncturing fire extinguishing device with a nail tip, a nozzle assembly positioned in an annular groove behind this, a lance-like fluid supply with a striking surface, and ball valve with a hose coupling positioned laterally at the rear end. This system, which is also sold under the name "Fognail," is used for being hammered, for example, through a door, lightweight partition wall, or wood paneling and immediately after this, for spraying fire-extinguishing fluid through the nozzle assembly. The nozzles are intended to produce a water mist and thus save fire-extinguishing fluid and minimize water damage. Interchangeable wide-spray heads and broad-spray heads with different nozzle assemblies are provided. The system also has a special hammer with two hammering sides, one of which is a hammering side for hammering the device in and the other has a spike for creating a hole into which the spike can be inserted.

This previously known puncturing fire extinguishing device is clearly suitable only for light-weight and comparatively thin-walled obstacles. It is therefore not possible to achieve access through thicker walls or complex wall or roof structures. It is therefore a special tool with a limited field of application. The device does not have the capacities or the necessary size and piercing technique to be able to achieve an optimal fire-extinguishing effectiveness in modern residential buildings.

SUMMARY OF THE INVENTION

The object of the present invention, therefore, is to provide a device and a system, which avoid or at least improve at least partial aspects of the above-mentioned disadvantages in the prior art.

The object is attained with a drill fire extinguishing device having the features described and claimed herein, a drill fire extinguishing system having the features described and claimed herein, and a drill bit having the features described and claimed herein. Advantageous modifications are disclosed in the dependent claims that respectively depend thereon.

A drill fire extinguishing device according to one aspect of the invention has:
  a tool holder that is embodied to hold a tool or be connected to a tool;
  a fluid connection that is embodied to supply a fluid;
  a turbine with an impeller that has at least one stage with a plurality of runner blades and is or can be connected to the tool holder in order, in a drive mode, to drive it in a rotary and/or percussive fashion through the use of the fluid supplied as a drive fluid via the fluid connection;
  at least one discharge opening, which is provided in a stationary wall of the drill fire extinguishing device and communicates with a fluid chamber provided downstream of the runner blades of the turbine and which constitutes a first flow path that is dimensioned to dispense the fluid—which is used as a drive fluid for operating the turbine in the drive mode—to the area surrounding the drill fire extinguishing device.

A drill fire extinguishing device as defined by the invention is a device for performing both a drilling function in structural obstacles such as walls, doors, roofs, roof structures, or the like and a fire extinguishing function by dispensing a fire extinguishing medium or fire extinguishing fluid. A tool holder as defined by the invention is a component that can be driven in a rotary and/or percussive fashion and produces a connection to a tool such as a drill bit, a chisel, or the like, and can, for example, be embodied in the form of a drill chuck with a detachable tightening or clamping function for detachably holding a tool. In another embodiment variant, a tool holder can also be simply an internal thread or a flange device that allows a tool such as a drill bit or chisel to be screwed in or on, a bayonet mount, or the like. The invention is also not limited to interchangeable tools, but can also be used with a tool or the like that is permanently attached to the drive shaft; in such a case, the connection between the tool and drive shaft would constitute a tool holder as defined by the invention. A tool as defined by the invention is a tool that operates in a rotary and/or percussive fashion such as a drill bit or a chisel. In general, the invention is thus especially intended for the use of tools that penetrate or destroy an obstacle in a drilling fashion, in particular in a cutting, abrading, shaving, and/or battering fashion. A fluid can be any fluid that is suitable for driving a turbine and for extinguishing a fire, for example and in particular water. A drive mode as defined by the invention is an operating mode in which the fluid is used entirely or substantially for driving the tool holder. A turbine is a machine in which the flow energy of a drive fluid is converted directly into rotation energy. A dimensioning of the first flow path in such a way that the fluid that is used as a drive fluid for operating the turbine in the drive mode is discharged to the area surrounding the drill fire extinguishing device should be understood, for example, to mean a flow cross-section that is produced based on the design of the turbine and the prevailing pressure conditions between inflowing and outflowing drive fluid in an operating state of the turbine for which it has been designed. A stationary wall is a wall that does not rotate along with rotating parts of the drill fire extinguishing device such as the impeller, the tool holder, the transmission, etc., but does not necessarily have to be a wall that absolutely does not move in space. If the drill fire extinguishing device itself is moved in space, then its wall naturally moves along with it.

Because of the discharge of the drive fluid through the discharge opening(s) embodied in the stationary wall of the drill fire extinguishing device, the drive fluid can also be distributed in the area surrounding the drill fire extinguishing device and can thus be used directly as fire extinguishing fluid for extinguishing flames in the area surrounding the user and also as a cooling fluid for cooling the surrounding area in order to prevent open flames from breaking out in a potentially flammable environment without this requiring an additional routing of fluid that bypasses the turbine. The discharged fluid can form a fluid barrier in front of the user with a considerable volumetric flow and considerable impact and can protect the user from flash fires that can be discharged from a space situated behind an obstacle when the latter is penetrated. This can be achieved particularly if the discharge openings are embodied so that the fluid coming out of the turbine is discharged at least largely in the radial direction into the area surrounding the drill fire extinguishing device. The drill bit or other tool can continue to operate while the fluid cools the surrounding area. Basically all fluids that are suitable for operating the turbine or for extinguishing fires can be used as the fluid, in particular water, possibly with additives such as foaming agents (wetting agents) or gases such as carbon dioxide, nitrogen, etc. and a combination of the two in the form of compressed-air foam, which can be added to the mixture particularly in the fire extinguishing mode.

It is basically not necessary for any nozzle bores to be provided in the drill bit or in the tool holder and the sealing of the rotating parts is not problematic. With a drill bit mounted in the tool holder, it is possible to drill through an obstacle and after this, to immediately push the drill fire extinguishing device farther through the bore in order to bombard the fire that is burning behind the obstacle with a fluid via the discharge openings and to thus fight the fire. It is also possible in the event of fires involving hazardous and/or unknown substances in the logistics sector, to fight the fire even without opening the shipping container or in the event of damage, to preventively neutralize escaping substances and, by using optional operating supplies such as water, gases, foaming agents (wetting agents) or a combination thereof, to prevent the spreading of a hazardous substance.

In addition to the above-described discharge openings, a nozzle assembly can be provided with one or more nozzles that is/are embodied in a stationary wall of the drill fire extinguishing device for dispensing the fluid and that communicates/communicate with a fluid chamber provided downstream of the runner blades of the turbine in order, in a fire extinguishing mode, to form a second flow path so that after the fluid has passed through the turbine, it is discharged as fire extinguishing fluid into a space surrounding the drill fire extinguishing device.

In an independent aspect of the invention, alternatively to the above-described discharge openings, the drill fire extinguishing device can also have the nozzle assembly. In this case, all of the properties, advantages, embodiments, improvements, and modifications that are described below can likewise be used.

A fire extinguishing mode as defined by the invention is an operating mode in which the fluid is used entirely or substantially for extinguishing a fire. The drive mode can be implemented, for example, in that instead of the above-described discharge openings, a different discharge path is provided. If the nozzle assembly is provided in addition to the above-described discharge opening(s), then the nozzles can discharge the fluid in a different shape than the discharge opening(s) and thus achieve a different effect. For example, the discharge openings can discharge the fluid with high impact in order to effectively flood the surrounding area and nozzles of the nozzle assembly can be embodied as spray nozzles in order to produce a fine fluid mist that can achieve a powerful cooling effect over a large area through rapid evaporation.

In any case, the flow cross-sections and/or flow resistances can be selected so that the fluid can be used to implement both operating modes simultaneously. On the other hand, a switching device can be provided, which switches the flow paths from the discharge opening(s) or another discharge path and from the nozzle assembly. Such a switching device can be or have a closing device, which selectively opens or closes the flow path through the discharge opening(s) or another discharge path. Such a switching procedure thus simply changes the flow path downstream of the turbine. By means of this, one and the same fluid flow can be selectively used both for driving and fire extinguishing without requiring the fluid to be bypassed around the turbine.

As stated above, the drill fire extinguishing device can be embodied with a nozzle assembly and without discharge openings. Depending on the embodiment (nozzle cross-section, flow resistance) of the nozzle assembly, this can require a high fluid pressure in order to still be able to operate the turbine. At lower fluid pressures, in particular at a low pressure of at most 16 bar, the fluid flow through the nozzles may no longer be sufficient to practically operate the turbine. The provision of the discharge openings and in particular the switching device can make it possible, in the event of such a low pressure, to suddenly increase the volumetric flow and thus ensure the operation of the turbine for driving the tool holder.

It should be understood that the drive mode and the fire extinguishing mode do not have to be entirely mutually exclusive. Even if the switching or closing device closes the discharge opening(s) in the second position, the fluid still continues to flow through the turbine. In this case, the impeller can rotate; because of the high flow resistance of the nozzles, the torque transmitted can be low. On the other hand, because of the friction resistances, the impeller of the turbine can also stop in the fire extinguishing mode. Conversely, in the first position of the switching or closing device, in which the at least one discharge opening is open, a certain portion of the fluid can also come out through the nozzles; in comparison to the output through the discharge opening(s), the output and the flow speed through the nozzles can be low.

If the turbine is an axial turbine or tubular turbine, then the drill fire extinguishing device can be embodied with a particularly slender and convenient design. The turbine can have at least one stationary guide apparatus with a plurality of guide vanes upstream of a stage of the runner blades in order to deflect the axial incident flow onto the runner blades of the impeller at the optimal angle. The guide vanes can be connected to or be embodied of one piece with the stationary wall of the drill fire extinguishing device.

The guide vanes and/or the runner blades can have an airfoil profile, preferably a NACA profile.

In a particularly advantageous way, the turbine is designed for an excess pressure of the fluid of at most about 16 bar between the fluid connection and the environment. Equipment, hoses, and fittings currently used in firefighting and emergency services are usually designed for a standardized low pressure of at most 16 bar. The drill fire extinguishing device can therefore be favorably used in such an environment.

It is advantageous if at its narrowest point, the first flow path has a flow cross-section that is larger or much larger than a cumulative flow cross-section of the second flow path at the respective narrowest point of all of the nozzles or has a flow resistance that is lower or much lower than a cumulative flow cross-section of the second flow path through all of the nozzles. It is thus possible to ensure that in the drive mode, the fluid reliably comes out substantially through the discharge openings.

The turbine can have a central collecting cone in order to convey the flow coming from the fluid connection to an annular conduit formed by the impeller and a wall of the turbine or drill fire extinguishing device or to an annular conduit of a guide device with guide vanes analogous to this annular conduit.

Preferably a deflecting device, in particular a conical one, is provided that is preferably positioned on an output shaft of the turbine, is embodied to deflect a fluid flow coming from the turbine to the discharge openings, and forms a front end of the fluid chamber. It is thus possible to reduce or avoid unwanted flow resistances.

It is advantageous if the drill fire extinguishing device has an approximately tubular shape. This can considerably facilitate the handling and transport of the drill fire extinguishing device, in particular the carrying of it by firefighting personnel. In addition, it is assumed and defined that the fluid connection is positioned at a rear end of the drill fire extinguishing device and the tool holder is positioned at a front end of the drill fire extinguishing device.

The fluid connection can advantageously provide an axial inflow of the fluid into the drill fire extinguishing device. As a result, the inflow of the fluid does not exert any torsional forces that have to be absorbed by the user.

If the switching or closing device has a tubular or approximately tubular slider that opens or closes the discharge openings selectively or partially, then the switching can take place by simply sliding the slider along the circumference surface of the drill fire extinguishing device.

The switching or closing device can have a spring, which prestresses the slider in the closing direction. The switching or closing device can also have a tensioning means, in particular a control cable or Bowden cable, which acts on the slider in the opening direction. It is thus possible to simplify the operation of the switching or closing device to a particular degree.

A deflecting device, in particular a conical one, can be provided that is preferably positioned on an output shaft of the turbine, is embodied to deflect a discharge flow from the turbine to the discharge openings, and forms a front end of the fluid chamber.

Between an output shaft of the turbine and the tool holder, a transmission, in particular a step-down transmission, can be provided and is or can be coupled into the path of force in order to bring the rotation speed of the turbine to a rotation speed suitable for drilling. In this connection, the transmission can have several step-up gears or step-down gears in order to adapt the rotation speed to different drilling resistances and materials. The drilling speed can alternatively or additionally also be influenced by means of the incident flow overpressure. If the transmission is embodied in the form of a planetary gear train, it can be accommodated in a tubular body in a particularly space-saving way.

In order to assist the drilling function or also to achieve a hammer-only function, a percussion mechanism is or can be coupled into the path of force between an output shaft of the turbine and the tool holder.

For assembly, it is particularly advantageous if parts of the drill fire extinguishing device positioned axially one after the other are connected to one another by means of screw connections; the screw connections are each embodied by means of an internal thread in a wall of the one part and an external thread in a wall of the other part. The walls of all of the parts that are positioned axially one after the other can combine to form the wall of the drill fire extinguishing device.

The device is particularly effective if the nozzles are embodied as spray nozzles that produce a fine spray mist. Fine atomization multiplies the surface area of the fire extinguishing medium and promotes heat extraction through evaporation. The promptly spreading water vapor hinders the intake of air and the lack of oxygen ends up smothering the flames; after a brief exposure time, the high extinguishing efficiency reduces the energy level of the fire to such an extent that an internal attack to extinguish the source of the fire can be carried out with enormously reduced risk. As a further consequence, the water damage is kept to a minimum.

If the nozzles communicate with the fluid chamber in both the first and second position of the switching or closing device, then it is possible to maintain a particularly simple design of the switching or closing device. Because of the high flow resistance through the nozzles, it is possible to eliminate a closing of the flow path through the nozzles in the drive mode.

The nozzles can be embodied by means of oblique bores in a wall of the drill fire extinguishing device so that an advantageous directional effect of the nozzle jet is produced, in particular directed obliquely toward the front. In this connection, the bores can also have a cylindrical or sharply conical countersink at their downstream end in order to optimize the effect of the nozzles.

In addition, an outer surface of the drill fire extinguishing device has axial grooves embodied in it, which extend from outlet openings of the nozzles axially in the direction of the front end of the drill fire extinguishing device in order to further improve the effect of the nozzles and to avoid a clogging of the nozzle openings during drilling.

The atomizing action of the nozzle assembly can be further improved if it has at least two groups of nozzles, the nozzles of which open in an annular fashion distributed over the circumference of the drill fire extinguishing device and are offset in the circumference direction and/or in the axial direction relative to the nozzles of the other respective group(s). The nozzle assembly can also have at least two groups of nozzles, the nozzles of which have different outlet angles so that a broadly fanned-out jet mist can be produced.

The drill fire extinguishing device can advantageously be used in a drill fire extinguishing system in order to form another aspect of the invention. The drill fire extinguishing system of this aspect of the invention also has a holding bracket with a device coupling and a hose connection. The hose connection in this case is embodied to be connected to a hose, preferably a fire hose, particularly in the form of a flange connection. The device coupling is embodied to be connected to the fluid connection at the end of the drill fire extinguishing device situated at an inflow opening of the drill fire extinguishing device. The inflow opening in this case is associated with the fluid connection of the drill fire extinguishing device. All of the fluid connections and fluid-carrying parts can be designed for a low pressure of for example at most 16 bar in accordance with firefighting standards.

The drill fire extinguishing system can also have a triggering device, which is or can be operatively connected to the switching or closing device of the drill fire extinguishing device in order to carry out the switch from the first position into the second position. For this purpose, the triggering device can have a manually operable lever. In addition, the triggering device can be coupled or have the capacity to be coupled to a tensioning means of the switching or closing device.

The holding bracket of the drill fire extinguishing system can have a hand grip and a shoulder rest to facilitate handling by a firefighter.

For use on a mobile device, the holding bracket can have a machine socket, device socket, or vehicle socket.

If the holding bracket has a tubular body extending between the hose connection and the coupling, then it is possible to produce an altogether tubular body with the tubular drill fire extinguishing device, which can further improve handling.

The drill fire extinguishing system can have a drill bit, which has:
  a shaft at a rear end of the drill bit, which can be inserted into the tool holder,
  a head, which extends forward from the shaft,
  an end face, which has one or more, preferably two or four, cutting edges, and
  a centering tip, which extends forward from the end face.

With the special design and special grind, the drill bit can have multiple versatility with regard to a large number of materials composing an obstacle that is blocking access to a burning space or building, so that it is equally possible to cut through for example wood, woodbased materials, plastics, composites, glass, stone, fiberboard, concrete, metals, and insulating materials. The head can have a helical shape, the helical shape preferably having a number of coils that corresponds to the number of cutting edges.

The end face of the drill bit rotating around a central axis can advantageously cover a cross-section, which in comparison to a maximum cross-section of the drill fire extinguishing device is oversized by at least 1 mm, in particular at least 2 mm, especially preferably at least 4 mm, at least in a frontal region of the drill fire extinguishing device. With a maximum device diameter of 50 mm, for example, the end face of the drill bit rotating around a central axis, can therefore cover a cross-section with a diameter of at least 51 mm, in particular at least 52 mm, especially preferably at least 54 mm. A frontal region of the drill fire extinguishing device can be a region that extends from the front end to a point beyond the discharge opening(s) and/or nozzle(s), preferably by a length that corresponds to a length of the head of the drill bit or more precisely, a thickness of an expected obstacle. As a result, after penetration of the obstacle by the drill bit, the drill fire extinguishing device at least including the nozzle assembly can be inserted through the borehole and the extinguishing procedure in the fire extinguishing mode can be started immediately.

For use with customary wall and roof thicknesses, the head of the drill bit can have a length of at least 150 mm, preferably at least 250 mm, especially preferably at least 400 mm. The head length can be adapted to a thickness of an obstacle to be drilled through. By means of a long head length, the drill bit can be provided with sufficient lateral guidance even in boreholes with composed of variable materials. With an overall length of at most 1000 mm, the drill bit is still easy to handle when in use.

Preferably, the end face is negatively or obtusely ground so that in relation to a plane perpendicular to a central axis of the drill bit, the cutting edge has a grinding angle that is at most 10°, preferably at most 8°, particularly at most 6°, especially preferably at most 4°, or is flat. A cutting angle of the cutting edge can be embodied to be less than 90° but in any case greater than 60°.

The drill bit can be composed of one piece or multiple pieces. For example, the head can be embodied as an insert support, which has a groove for holding a cutting insert; the end face with the cutting edge and the centering tip is embodied on the cutting insert.

The cutting geometry is developed as a combination of proven geometries from other fields. Features can be a centering tip and a flat to negatively set cutting geometry in order to be able to exert the necessary cutting pressure in the case of structures made of sheet metal. The cutting angle itself can preferably be embodied as very obtuse in order to be able to cut through nails or screws that are present in the soft wood without significant damage to the edge.

In an independent aspect, the invention is directed at a drill bit with at least some of the above-described features.

Other and special objects, features, and advantages will become apparent from the following description of exemplary embodiments.

BRIEF DESCRIPTION OF THE DRAWINGS

The invention will now be described by way of example based on currently preferred exemplary embodiments with reference to the attached drawings. In the drawings:

FIGS. 4A-4C: show the drill fire extinguishing device in the state from FIG. 1 in a top view corresponding to FIG. 3B, a longitudinal sectional view along an axial central plane from FIG. 4A, and a cross-sectional view looking in the direction of arrows and along a plane C-C in FIG. 4B;

FIGS. 14A-14C: show a perspective view, a side view, and a front view of a drill fire extinguishing system with the drill fire extinguishing device from FIG. 1 in a manual use configuration;

FIG. 16: is a perspective view of a cutting insert for a drill bit in an embodiment variant for use in the drill fire extinguishing device from FIG. 1; and FIGS. 17A-17C: show views of the cutting insert from FIG. 16 that are labeled with arrows A, B, and C therein.

DETAILED DESCRIPTION OF THE INVENTION

Figure 1:
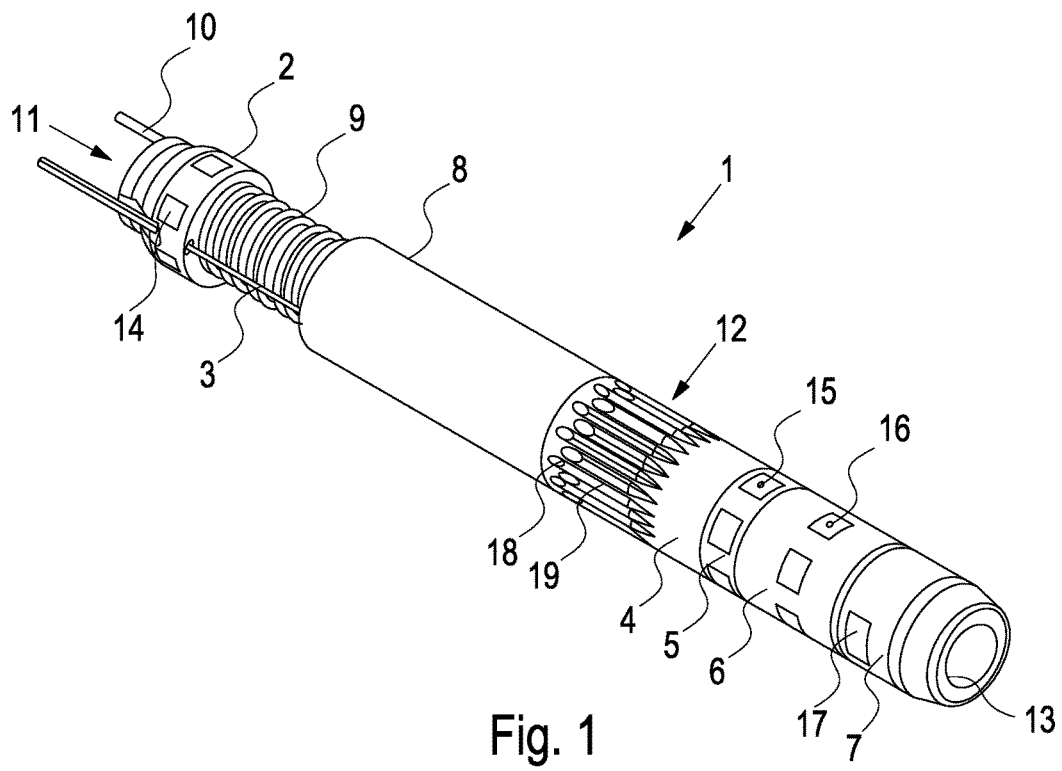
FIG. 1: shows a perspective view of a drill fire extinguishing device according to an exemplary embodiment of the present invention in a closed state of a slider.

The drawings are purely schematic and are intended solely for illustrating the principle and the effect of the present invention, not for inferring specific dimensions unless express reference is made to them. It should be understood that the graphic depiction is intended to aid comprehension of the present invention and that design details, which have no influence of the basic effect according to the invention, can be omitted from the drawings. Conversely, it should be understood that not every design detail shown in the drawings necessarily has to be present in order to implement the concept of the invention or be embodied as shown. The person skilled in the art will modify, rearrange, or supplement the exemplary embodiments shown according to his needs without departing from the features that characterize the invention.

One embodiment of the invention is a drill fire extinguishing device 1, which, by means of its own drive unit, can penetrate obstacles in particular such as building structures and then introduce fire-extinguishing water into a space behind the opening produced. The penetration is carried out by drilling through roofs and walls. The drive power of the drilling mechanism is drawn from the fire extinguishing medium by converting the latter's hydraulic energy into rotation energy. The conversion can be carried out by means of a propeller/tubular turbine that is especially designed for the specific application and that is characterized by means of a deflected fluid flow at the outlet of the turbine.

Figure 2:
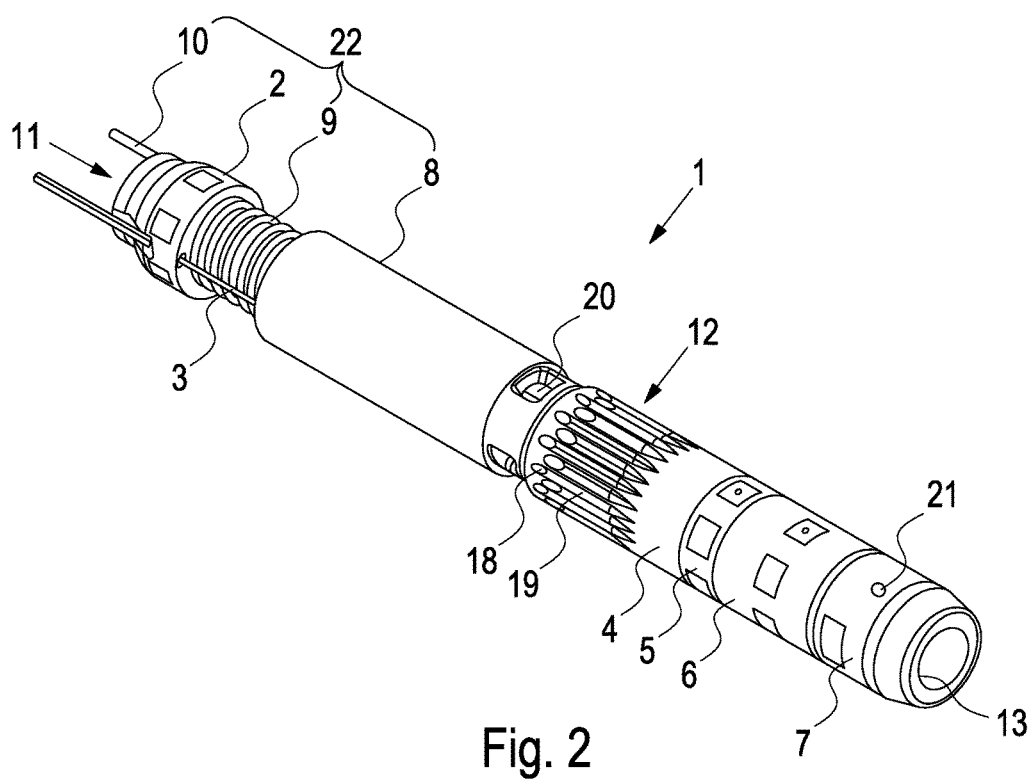
FIG. 2: shows the drill fire extinguishing device from FIG. 1 in an open state of the slider.
Figure 3A:
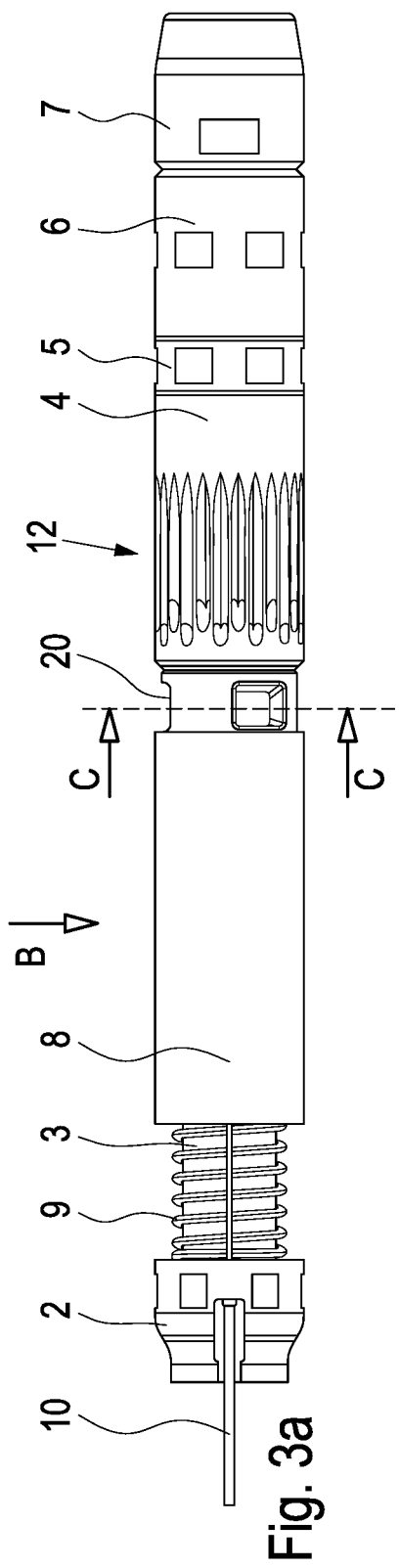
FIGS. 3A-3C: show the drill fire extinguishing device in the state from FIG. 2 in a side view, a top view looking in the direction of an arrow B in FIG. 3A, and a cross-sectional view looking in the direction of arrows and along a plane C-C in FIG. 3A.
Figure 3B:
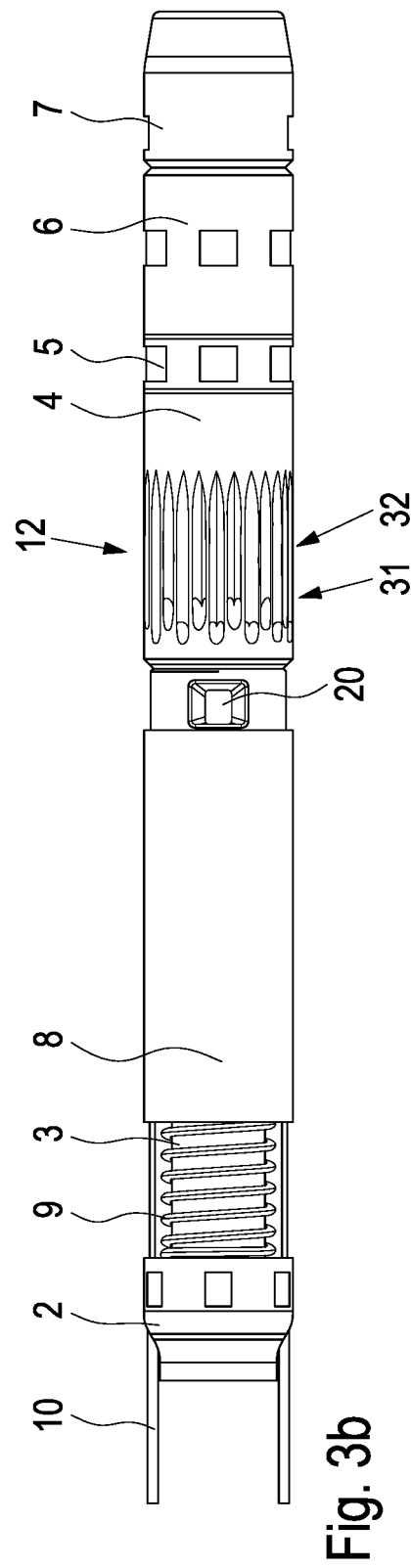
Figure 3C:
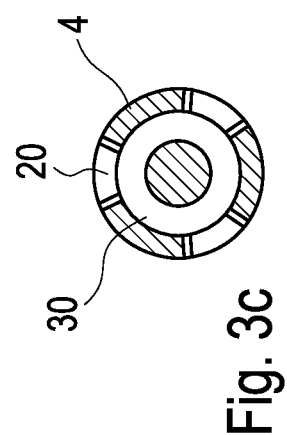

The drill fire extinguishing device 1 of a preferred exemplary embodiment is embodied as approximately tubular in its outer appearance (FIGS. 1, 2 ff.). One after the other from an inlet opening 11 to a tool holder opening 13, it has an adapter piece 2, a spacer tube 3, a nozzle housing 4, a transmission unit 5, an intermediate piece 6, and a drill chuck 7 (FIGS. 1, 2 among others). A slider 8 is supported in sliding fashion on the nozzle housing 8 and by means of a return mechanism in the form of a spring 9 here, namely a helical spring, is prestressed against the adapter piece 2. A tensioning means 10 acts on the slider 8 so that the slider 8 can be pulled back in opposition to the action of the spring 9. The slider 8, the spring 9, and the tensioning means 10 form a switching device 22, which is embodied as a closing device that can define a first position in which the slider 8 is pulled back (FIG. 2) and a second position in which the slider 8 is resting against a stop edge of the nozzle housing (FIG. 1). In the first position (FIG. 2), a plurality of discharge openings 20 are open, which are embodied in the wall of the nozzle housing 4 and which are covered by the slider 8 in the second position (FIG. 1).

The spacer piece 2 is provided with an inlet opening 11, which also constitutes a rear end of the drill fire extinguishing device 1. The nozzle housing 4 is provided with a nozzle assembly 12 that communicates with the inlet opening 11. The tool holder 7 is provided with an insertion opening 13, which also constitutes a front end of the drill fire extinguishing device 1. The tool holder 7 can be embodied as a drill chuck. In order to affix or secure a tool, a set screw 21 can be provided in a wall of the tool holder 7 (FIGS. 2, 4A).

The nozzle assembly 12 has a plurality of nozzles 18, which pass through a wall of the nozzle housing 4 and which continue toward the front end 13 in axially parallel grooves 19. The nozzles 18 can be positioned distributed over the circumference of the nozzle housing 4 in two axially spaced rows or rings 31, 32 (FIG. 3C); the rows 31, 32 can also be offset in the circumference direction by one half the spacing of the nozzles 18 in a row 31, 32. The adapter piece 2, the nozzle housing 4, the transmission unit 5, the intermediate piece 6, and the tool holder 7 each have respective wrench-engaging surfaces 14, 15, 16, 17, by means of which the parts can be screw-connected to one another, as described in greater detail below. The nozzles 18 and the discharge openings 20 can communicate with a for example annularly embodied fluid chamber 30 that is embodied inside the nozzle housing 4 (FIGS. 3A, 3B, 3C, 4A, 4B among others).

The tensioning means 10 can be embodied as a Bowden cable or in a form similar to one and can have one or more cable(s) 46, which are each guided in a sleeve 47 and end with an end cap 48 (FIG. 4B). The end cap 48 can be supported in the slider 8 and the sleeve 47 can be supported on the adapter piece 2 whereas the cable 46 can travel freely through the spacer tube 3.

Figure 5A:
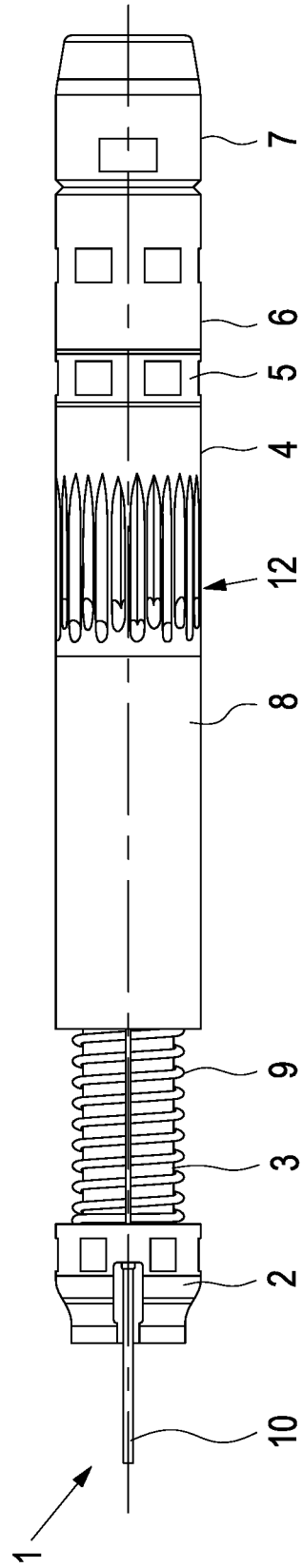
FIGS. 5A-5C: show the drill fire extinguishing device in the state from FIG. 1 in a side view corresponding to FIG. 3A, a longitudinal sectional view along an axial central plane from FIG. 5A, and a cross-sectional view looking in the direction of arrows and along a plane C-C in FIG. 5B.
Figure 5B:
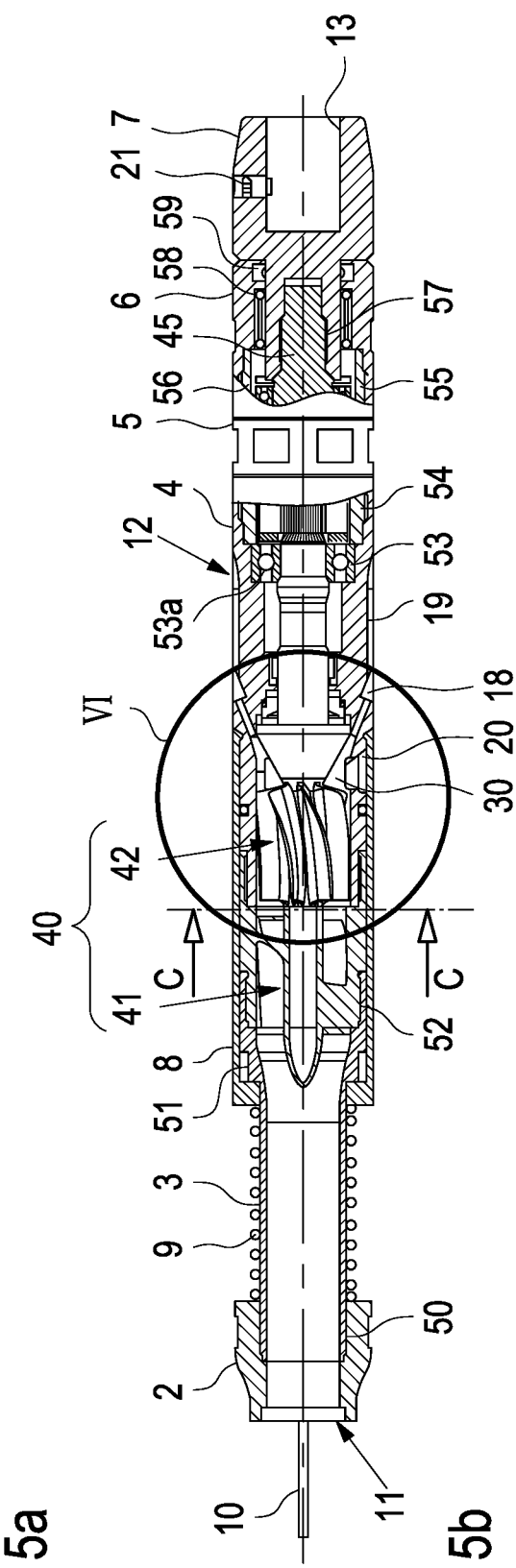
Figure 5C:
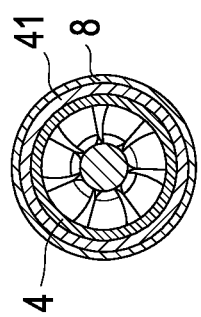

The drill fire extinguishing device 1 has a propeller/tubular turbine or axial turbine (hereinafter for short: turbine) 40, which communicates with the inlet opening 11 and drives the tool holder 7 in rotary fashion (FIGS. 4B, 5B among others). The turbine 40, which is also referred to as a DEFLOW turbine, can have a guide apparatus 41 and an impeller 42. At its output end, the impeller 42 can have a splining 43, which is used for coupling to a drive shaft 44 of the transmission unit 5. An output shaft 45 of the transmission unit 5 can be permanently coupled to the tool holder 7 or coupled to it in a detachable fashion.

Figure 6A:
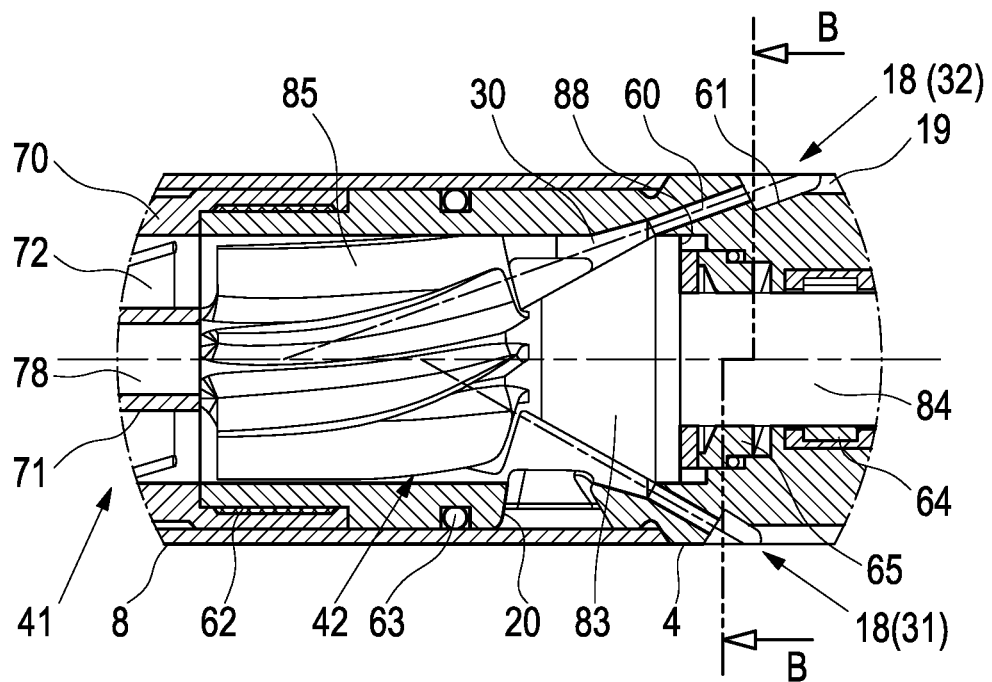
FIG. 6A: shows an enlarged depiction of a detail VI from FIG. 5B.
Figure 6B:
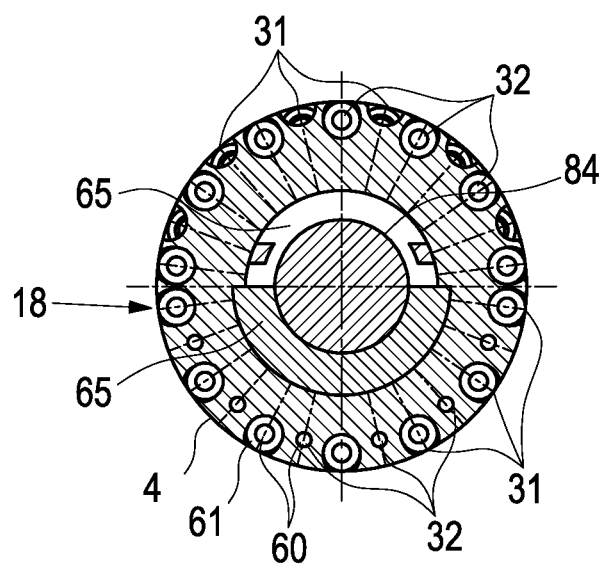
FIG. 6B: shows a cross-sectional view of the drill fire extinguishing device looking in the direction of arrows and along a plane B-B in FIG. 6A.

The intermediate tube 3 can be connected to the adapter 2 by means of a screw connection 50, the guide apparatus 41 of the turbine 40 can be connected to the intermediate tube 3 by means of a screw connection 52, the nozzle housing 4 can be connected to the guide apparatus 41 by means of a screw connection 62, the transmission unit 5 can be connected to the nozzle housing 4 by means of a screw connection 54, and the intermediate piece 6 can be connected to the transmission unit 5 by means of a screw connection 55 so that the adapter 2, the intermediate tube 3, the guide apparatus 41, the nozzle housing 4, the transmission unit 5, and the intermediate piece 6 are positioned axially one after the other and form a tubular body (FIGS. 5B, 6A).

Figure 7A:
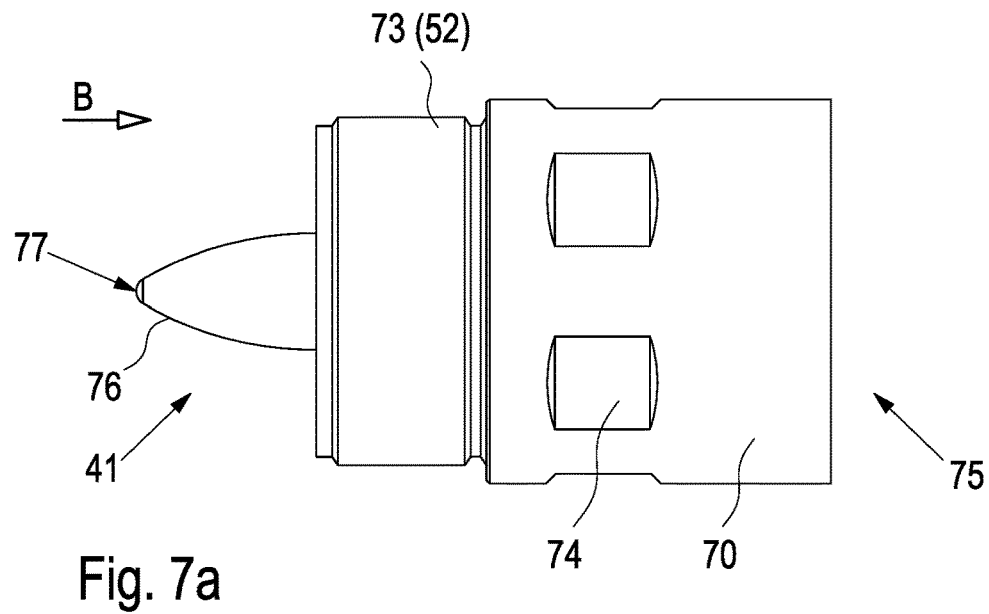
FIGS. 7A-7C: show a side view, a partially cutaway end view, and a partially cutaway perspective end view of a guide device of a turbine in the drill fire extinguishing device from FIG. 1.
Figure 7B:
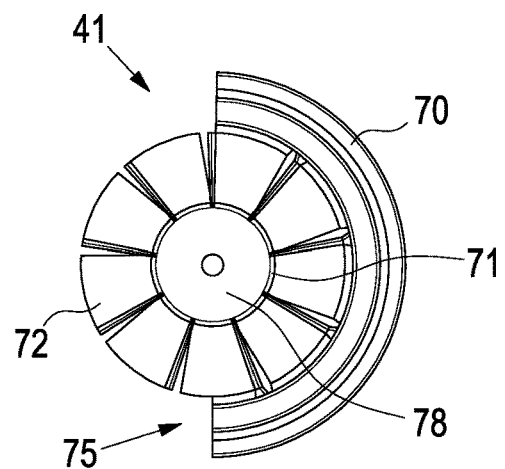
Figure 7C:
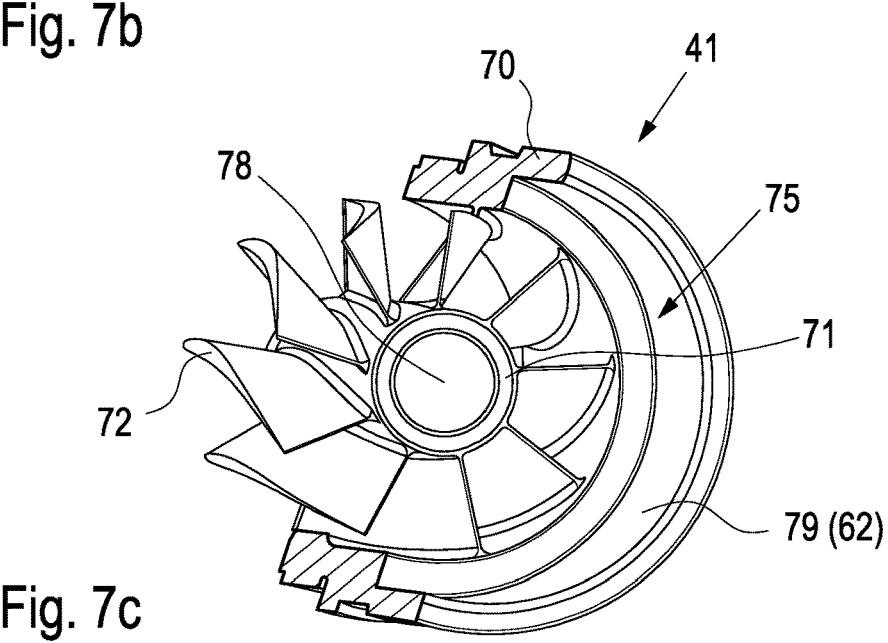
Figure 9:
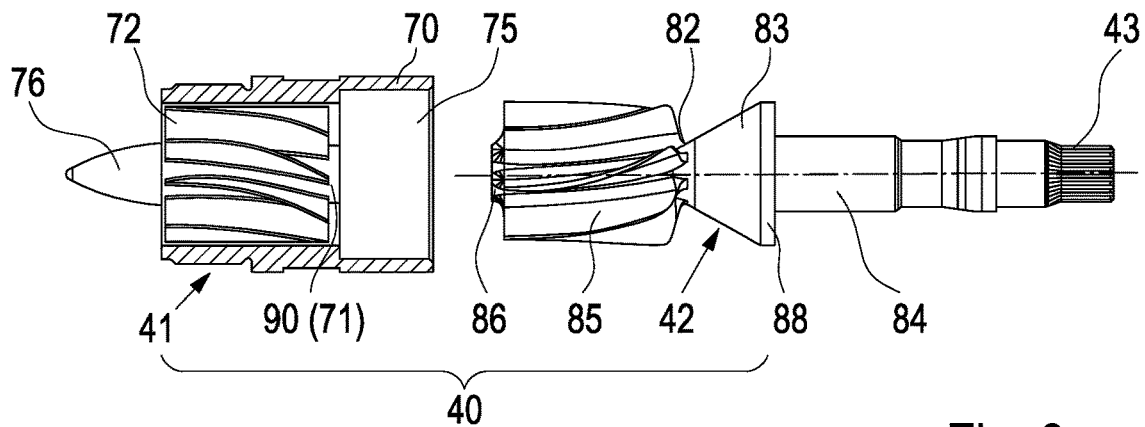
FIG. 9: shows an exploded side view of the guide device and of the impeller from FIGS. 7A-8C.

The guide apparatus 41 is a stationary component, which can have a cage 70, a flow divider 71, and a plurality of guide vanes 72 (FIGS. 7A-7C). The guide vanes 72 can extend between they flow divider 71 and the cage 70. The flow divider 71 can be connected to the guide vanes 72 in a single piece. At its upstream end, the cage can have an external thread 73 that is a part of the screw connection 52 to the spacer tube 3. In addition, several wrench-engaging surfaces 74 can be provided, which facilitate production of the screw connection. At its downstream end, the cage can have a receiving space 75, which serves to receive an upstream end of the nozzle housing 4 and the impeller 42 (FIGS. 6A, 9). At its upstream end, the flow divider 71 tapers to an inflow end 76 with a stagnation point 77. The flow divider 71 can be embodied as hollow at its downstream end in order to reduce mass, which can also be advantageous for production, for example by means of a laser sintering process, and can thus have a cavity 78. In the region of the receiving space 75, the cage 70 can also have an internal thread 79 that is a part of the screw connection 62 to the spacer tube 3. The guide vanes 72 can be exposed at the end oriented toward the receiving space by means of a shaft stub 90 (FIG. 9).

By means of the guide vanes 72, the flow can be deflected onto the impeller 42 connected downstream. The resulting spin of the flow can be reduced by the impeller 42 of the turbine 40. In one exemplary embodiment, nine guide vanes 42 can be provided. The vane geometry can be designed analogously to NACA airfoil profiles that keep the guidance angle constant relative to the diameter, which can cause a twisting of the vanes. Naturally, it is also possible to select airfoil profiles that are not part of a NACA list. It is advantageously possible to use the SLM process (steel 3D printing) to produce the component.

The design of the profile can be carried out using methods that are known to the person skilled in the art for obtaining the desired flow properties. NACA profiles are based on the concept of circles that are drawn on a line, the profile midline. A tangential contour line is placed around these circles, which constitutes the profile's form line. NACA profiles are defined in series based on characteristic parameters. A four-digit NACA series can be specified for example by means of the parameters: maximum camber m in % of chord, distance of the maximum camber from leading edge p in tenths of the chord, maximum thickness tt of the airfoil (two digits) in % of the chord, possibly with additional specification of an index for the leading edge radius a and of the distance of the maximum thickness from leading edge b. Other series use other parameters and/or other approaches for airfoil definition. In order to arrive at the exact curvature, a complex calculation process is carried out, which must come successively closer to the conditions with each design. Consequently the parameter of the NACA profiles are adapted for each design and are embodied with the necessary angles and thickness ratios. An airfoil of this kind is not absolutely necessary, but can improve the flow properties of the turbine shaft and guide apparatus. In practice, therefore, four profiles can be established, namely the root and tip of the guide vane and the root and tip of the runner blade.

Figure 8A:
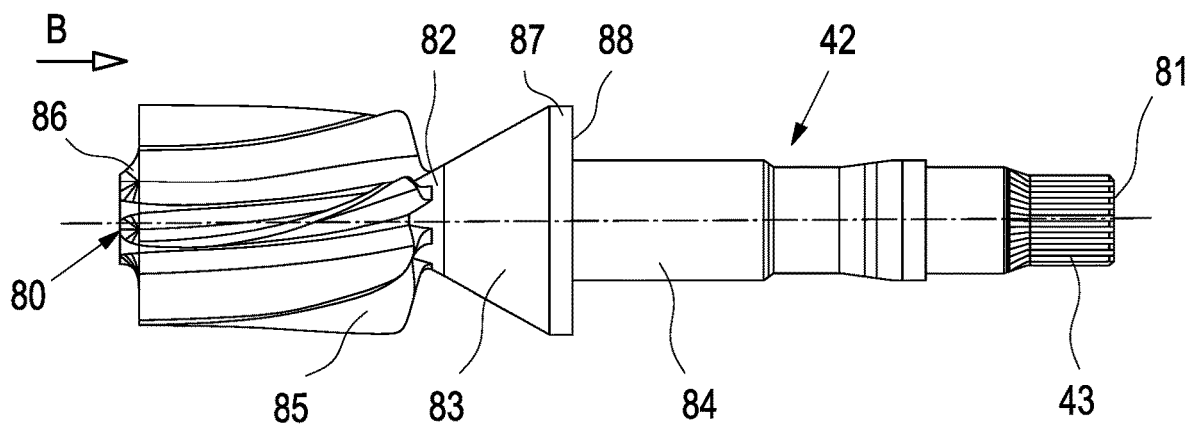
FIGS. 8A-8C: show a side view, a partially cutaway end view, and a partially cutaway perspective end view of an impeller of the turbine in the drill fire extinguishing device from FIG. 1.
Figure 8B:
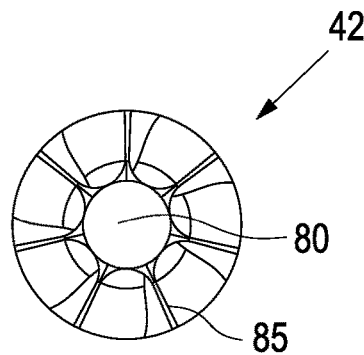
Figure 8C:
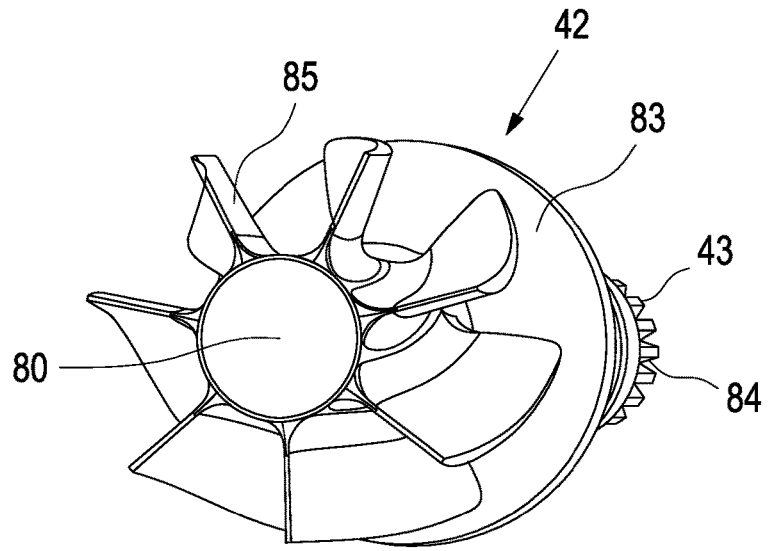

The impeller 42 has a turbine shaft, which can be subdivided into the sections of the vane shaft 82, guide cone 83, and turbine output shaft 84 in axial succession (FIGS. 8A-8C). The vane shaft 82 supports a plurality of runner blades 85, which convert the hydraulic energy into rotary energy. In one exemplary embodiment, seven runner blades 85 can be provided. The runner blades 85 can be exposed at one end (upstream end) 80 by a shaft stub 86. The wall thickness of the airfoil profiles of the runner blades 85 can decrease with increasing diameter because the load is also dependent on the diameter.

At its downstream end, the guide cone 83 can first have a cylindrical part 87 as a transition and then a shaft shoulder 88, which serves as a stop face of the mechanical shaft seal 65. The bearing seat that follows this can support a movable bearing 64, which in this case, can be embodied in the form of a needle bush (FIG. 6A). As a fixed bearing, a normal grooved ball bearing 53 can be provided after this (FIG. 5B). At its end, the turbine output shaft 84 can be embodied as a pinion shaft in order to keep the overall design slender. The pinion (splining) 43 provided thereon can constitute the sun gear of the first planetary stage in the transmission unit 5, which can be embodied as a planetary gear train. The splining 43 can, however, also couple with a transmission drive shaft that supports the sun gear. A planet carrier that is not shown in detail and that has a plurality of planet gears can end in a transmission output shaft 45.

The guide cone 83 can be provided in order to guide the flow through the fluid chamber 30 to the nozzles 18 (flow path 102 in FIG. 10B) when the slider 8 is closed. When the slider 8 is open, the flow can travel from the fluid chamber 30 to the discharge openings 20 (flow path 101 in FIG. 10A).

The nozzle assembly 12 supports essential functions of the drill fire extinguishing device 1. The nozzle assembly 12 has a plurality of nozzles 18. In one exemplary embodiment, twenty-six nozzles 18 can be provided. The nozzles 18 are each embodied in the nozzle housing 4 by an oblique bore 60 that can have a cylindrical countersink 61 on the outside and inside the nozzle housing 4, can communicate with a fluid chamber 30 that is embodied downstream of the impellers 85 of the turbine 40 between the guide cone 83 and the wall of the nozzle housing 4. The nozzles 18 can be positioned offset from one another, for example in two nozzle rings 31, 32, in order to achieve greater coverage. In addition, grooves 19 serving as outlets can be milled into the nozzles 18. These grooves can serve to enlarge the cooling surface area and for flushing purposes at the entry into the borehole. Behind the nozzles 18, there are several (here, for example: three) discharge openings 20, which are embodied as openings that are comparatively large in area (in comparison to the bores 60) in the wall of the nozzle housing 4 and can be covered by the slider 8 (FIG. 1 among others) or opened by it (FIG. 2 among others).

Figure 10A:
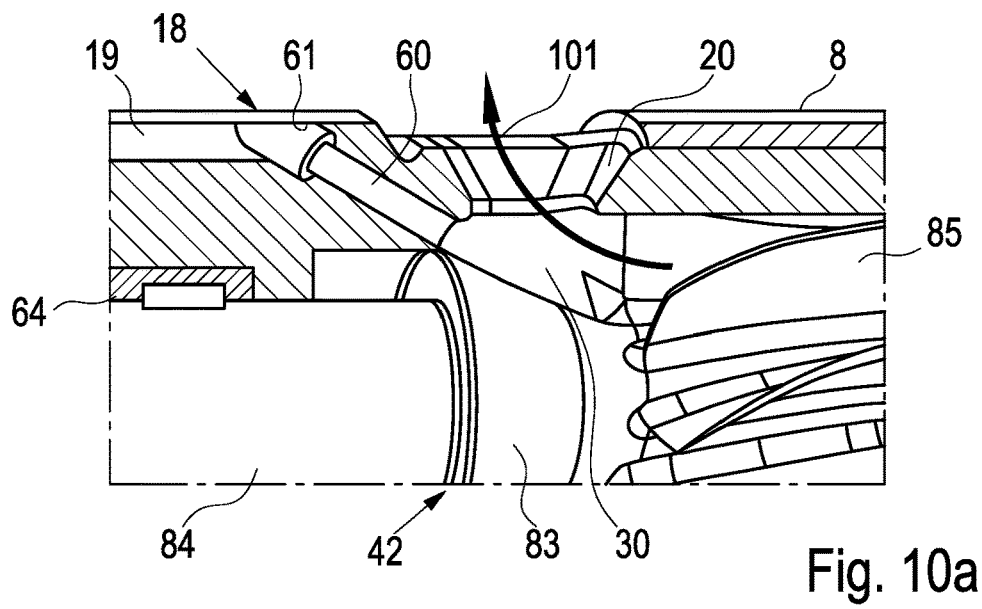
FIGS. 10A, 10B: are each a cutaway partial view for showing flow paths in the open and closed state of the slider.
Figure 10B:
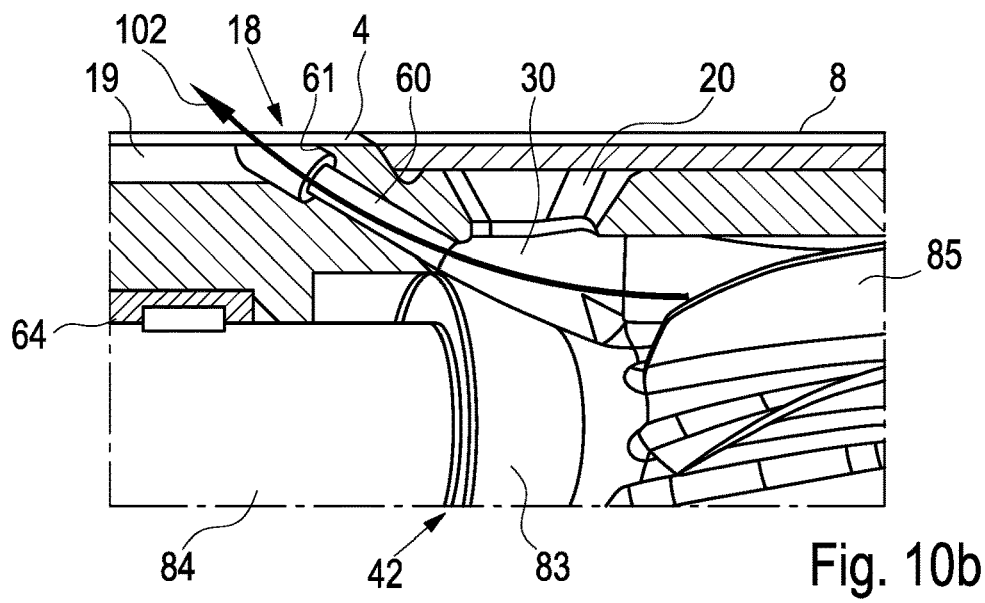

The adaptive cross-sectional expansion that this enables makes it possible to control the volumetric flow and thus the turbine power. In drilling mode, the slider 8 is pulled back into a first position; it is thus possible to reduce the pressure on the turbine 40 and the majority of the volumetric flow is conveyed via a first flow path 101 and out via the discharge openings 20 (FIG. 10A). In fire extinguishing mode, the slider 8 is slid into a second position over the discharge openings 20 and closes them. As a result, the turbine 40 turns in an idle mode and the pressure at the nozzles 18 is reduced by means of a second flow path 102 (FIG. 10B). The volumetric flow in this case is at full and is discharged entirely via the nozzle assembly 12. The slider 8 is thus slid on the nozzle housing 4 in the longitudinal direction to control the cross-sectional expansion. The support of the slider 8 is provided by a Teflon ring 51 and the seal is provided by an O ring 63 and a conical sealing surface at the end of the slider 8. In the normal state, the slider is prestressed against the adapter 2 by a helical spring 9. In order to switch to the drilling mode, the slider 8 is pulled back by means of the two Bowden cables 10. As a result, the discharge openings 20 open and the water can flow out laterally in a controlled fashion.

In order to achieve an ideal power distribution, discharge openings 20 can be opened in addition to the nozzles 18. The expansion of the cross-section produces an increased mass flow and this yields a higher turbine power. Because of the limited space, the power at the turbine must be discharged by means of a high rotation speed. A planetary gear train 5 can then be used, which reduces the rotation speed to an ideal drilling speed by increasing the torque. In order to reduce the rotation speed and achieve the necessary torque, a planetary gear train 5 is connected after turbine 40. With a gear ratio step-up of for example 1:10 to 1:16, this can be achieved by means of a plurality of planetary stages. At its output end, the shaft 45 can be supported in an intermediate piece 6 and apart from this, can be linked directly to the tool holder 7.

Figure 11A:
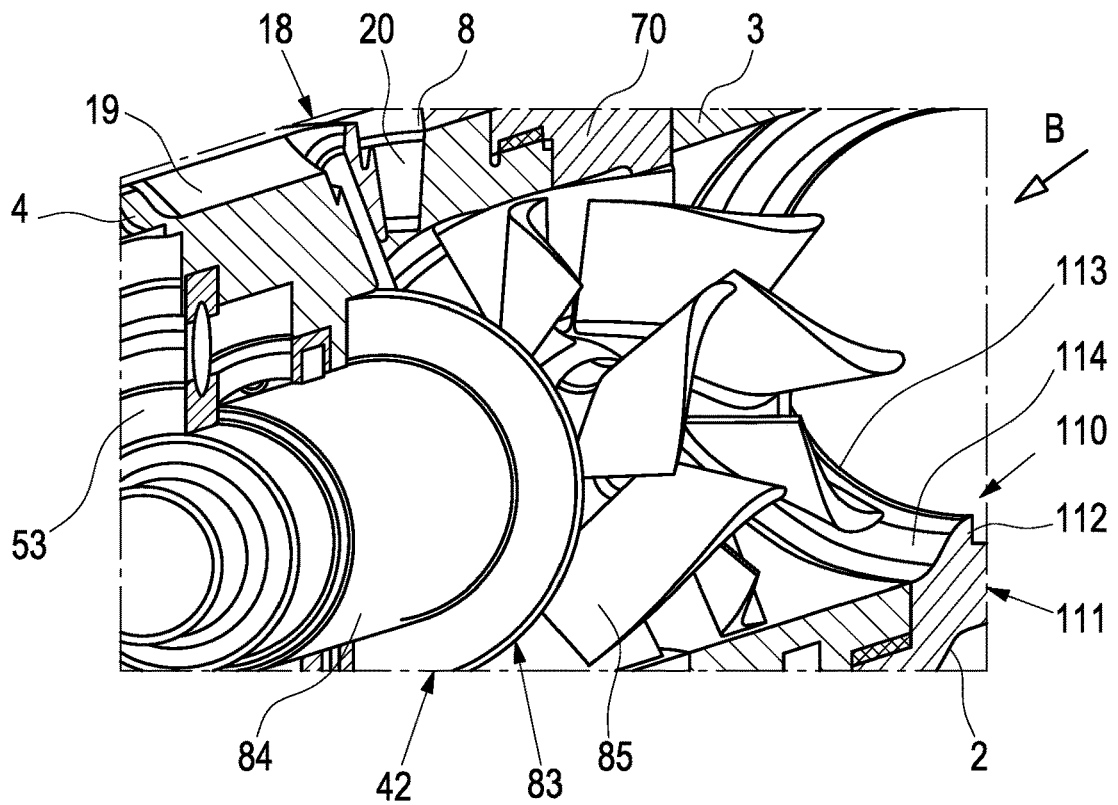
FIGS. 11A, 11B, and 12: are cutaway perspective partial views for illustrating an internal structure of the drill fire extinguishing device.
Figure 11B:
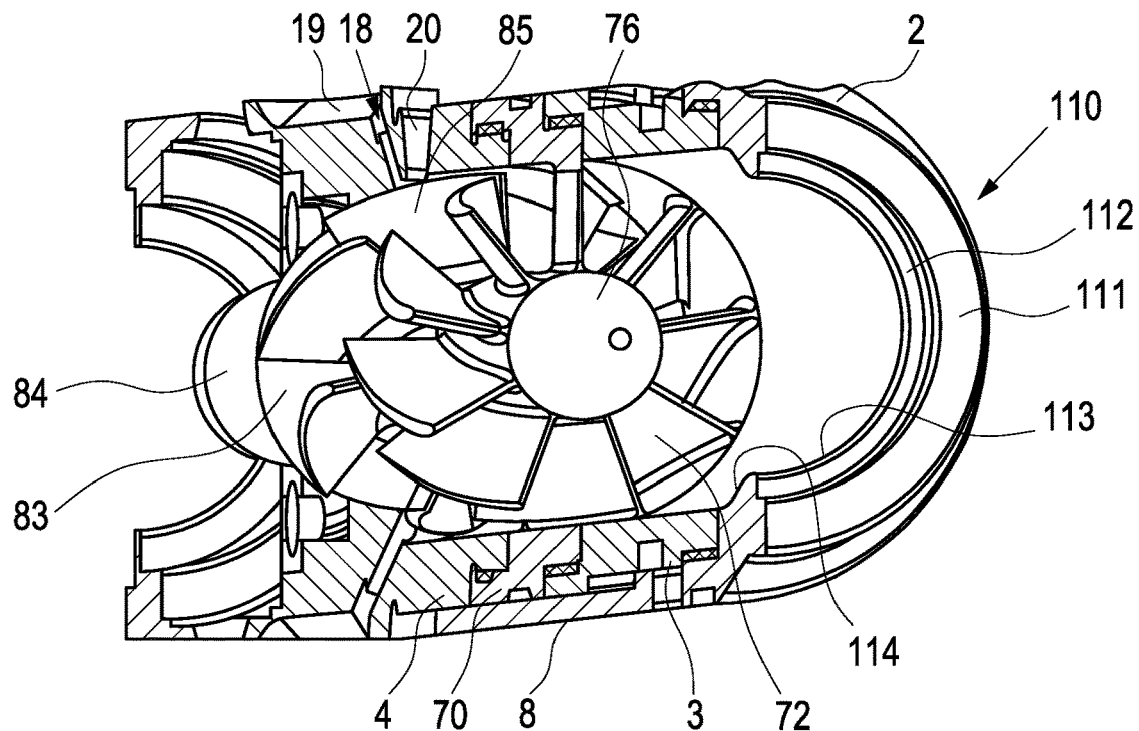
Figure 12:
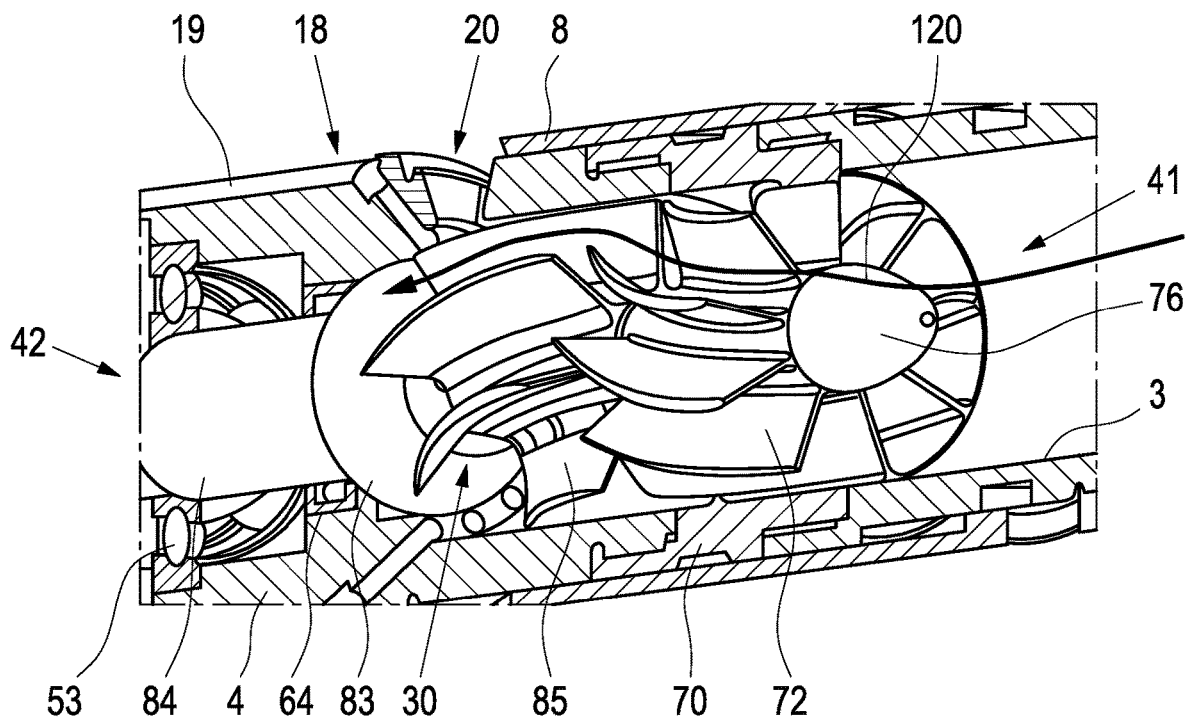

The adapter 2 is used to connect to a holding bracket and can have a coupling device 110 for this purpose. To accomplish this, first an end face 111 and a recessed shoulder surface 112 can be provided as a stop. The latter shoulder surface 112 can have an annular surface 113 oriented radially inward and on the downstream end, can have an oblique ramp surface 114 that a clamp, a claw, or the like of the holding bracket can engage behind (FIGS. 11A, 11B).

The tool holder 7 serves as an interface between the tool (drill bit 130, FIGS. 13, 14A-14C) and the drive train. For example, a standardized Weldon holder can be used for the connection to the tool. The needle roller bearing 58 supports the tool holder 7 with its relatively large collar length (FIG. 5B). The bearing 56 on the transmission output 45 serves as a fixed bearing. The tool holder 7 can be connected to the transmission output shaft 45 by means of a screw connection 57; it can be supported against a cone 45a and can also be centered at the end by a cylindrical seat 45b (FIG. 4B). The seal relative to the outside can be produced by means of a radial shaft seal ring 49.

The housing of the transmission unit 5 is extended by an intermediate piece 6 in order to accommodate the support bearing 58 and the radial shaft seal ring 59 (FIGS. 4B, 5B). In the other components, the centering can be carried out by means of the screw connection 55 with the conical and cylindrical seat. In this sense, the intermediate piece 6 is merely an extension of the housing.

Figure 13:
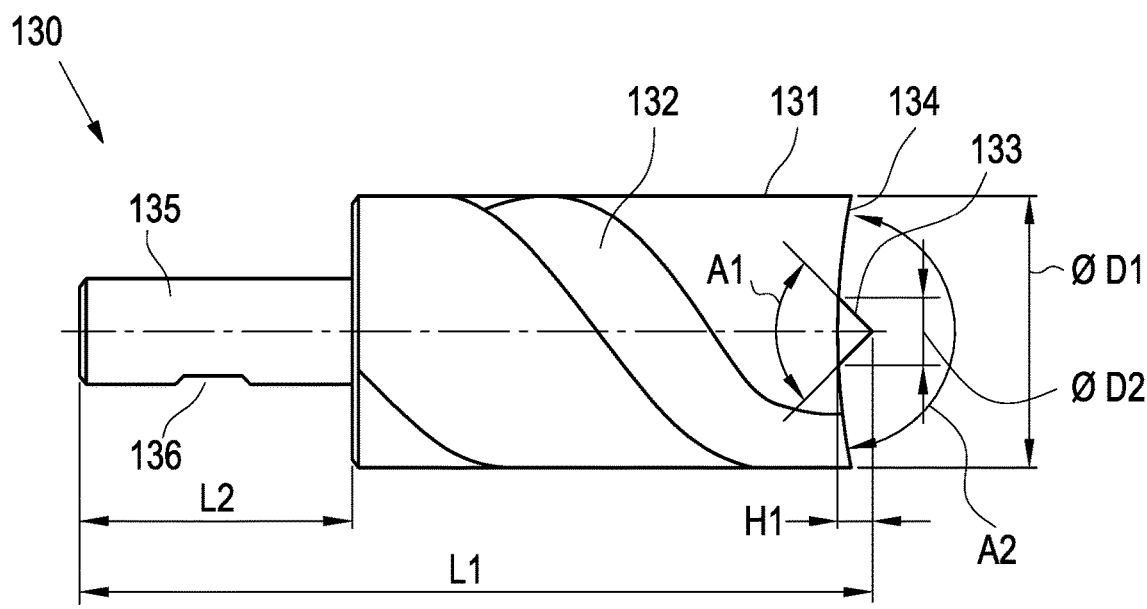
FIG. 13: shows a side view of a drill bit for use in the drill fire extinguishing device from FIG. 1.

The drill fire extinguishing device 1 can be used on an extremely wide variety of materials. The device 1 according to the invention can therefore be used with a universal drill bit 130 that can drill through brick, wood, sheet metal, and other construction materials to a depth of up to 50 cm (FIG. 13). The drill bit 130 can be embodied as being of one piece. The drill bit 130 can have a shaft 135, which is embodied to be received in the receiving opening 13 of the tool holder 7, and a head 131. The head 131 can be embodied with a double helical groove 132, a centering tip 133, and an end face 134. The shaft 135 can have a driving surface 136 for fixing it in position in the receiving opening 13 by means of the clamping screw 21. The driving surface 136 can be embodied for a Weldon holder, for example in accordance with DIN 6535 HB.

The drill bit 130 has an overall length L1; the shaft 135 has a shaft length L2; the head 131 has a head diameter D1; the centering tip 133 has a tip height H1, a tip angle A1, and a tip base diameter D2 at its base; and the end face 134 has a cone angle A2. For the multiple versatility, a special grind was developed, which has excellent cutting properties both in soft wood and in hard sheet steel. The basis for the drill bit can be an HSS steel drill bit with a special grind. In this connection, a tip angle A1 of approximately 60-90° and a cone angle A2 of approximately −160° to −170° have turned out to be practicable. The tip base diameter D2 is limited by the depth of the helical shape 132 and can, for example, be 10-15 mm. The tip height H1 can then be inferred as a resulting dimension and can, for example, be 5-10 mm. The driven drill bit 130 is oversized relative to the housing of the drill fire extinguishing device 1. If the housing has, for example, an outer diameter of 50 mm, then the drill bit 130 can, for example, have a head diameter D1 of approximately 52 mm. The shaft 135 can be dimensioned based on the circumstances of the tool holder and can, for example, have a length L2 of approximately 50-55 mm. The overall length L1 of the drill bit 130 can be selected with a view to an obstacle that is to be expected. For interior walls, for example, the overall length L1 can, for example, be approximately 150 mm; for roof structures, lengths of up to 500 mm or more can be useful.

In one embodiment variant, the tool can have a support with a cutting insert 160 (FIGS. 14A-14C, 16, 17A-17C). The support can, for example, be made of tool steel and can have a helical shape like a one-piece drill bit (see FIGS. 14A, 14C). The cutting insert 160 can, for example, be made of HSS. The cutting insert 160 can be a basically flat block shape with two flat surfaces 161, two side surfaces 162, a base surface, 163, and an end face 164 from which a centering tip 165 protrudes (FIG. 16). In the base surface 163, which comes to rest in a groove of the support, a centering groove 166 can be provided. Between the flat sides 161, one or more fastening bores 167 can be provided, which can be smooth or can be provided with an internal thread. In the latter case, the fastening bores 167 can be embodied as blind-hole bores or through bores; smooth fastening bores 167 are embodied as through bores, possibly in the form of locating holes.

In the end face 164 of the cutting insert 160, cutting edges 170 are provided on both sides of the centering tip 165, each oriented in the respective rotation direction 168; under the cutting edges 170 in the flat surfaces 161, respective clamping grooves 171 can be provided (FIGS. 17A-17C). The end face 164 can have a respective back-off clearance 172 behind the cutting edges 170. In addition, the centering tip 165 can have cutting edges 175 that are adjoined underneath by respective clamping grooves 172 and these have a support surface 175 and back-off clearance 176 following them in relation to the rotation direction 168. The side surfaces 162 have respective cutting edges or clearing edges 176 oriented toward the rotation direction 168, which are each followed in relation to the rotation direction 168 by a respective support surface 177 and a back-off clearance 178.

The cutting insert 160 has an overall height H2 and an overall width W1, the centering tip 165 has a half of the tip angle A3, and the end face 164 and the cutting edge 170 has a grinding angle A4 relative to a plane perpendicular to the central axis M of the cutting insert 160. Details relating to the drill bit 130 can also be used for the design of the cutting geometry. A grinding angle of approximately 7° has turned out to be particularly advantageous. Once again in relation to a device diameter of 50 mm, a width W1 of approximately 52 mm is practicable, thus yielding an oversizing of 2 mm. As a result, the drill fire extinguishing device can also be easily inserted through the hole produced by the drill bit 130 without jamming. If need be, the oversizing can also be smaller, for example approximately 1 mm, or larger, for example approximately 4 mm. The half of the tip angle A3 can, for example, be approximately 45°, which corresponds to a tip angle A1 of approximately 90°.

Regardless of how the drill bit 130 is designed (whether in one piece or with a cutting insert 160), the cutting geometry can be embodied so that it is possible to cut through all potential construction materials, in particular all potential roof structure materials. In particular, the drill bit 130 has multiple versatility with regard to various materials such as wood, metal, stone, possibly concrete, hard fiberboard, and insulating materials. Centering is provided by a centering tip 133, 165 in the middle of the drill bit 130 or cutting insert 160. For ideal cutting, the cutting flanks are set to be negative or in special cases, are even set to be obtuse.

The device can be operated using manual guidance or machine guidance.

As a water turbine with a purpose-built performance, the turbine is extremely space-saving and light-weight and has a high power density. In one exemplary embodiment, the turbine has an outer diameter of 32 mm and can thus discharge approx. 3.5 kW with up to 8 Nm and more than 4000 rpm of mechanical energy. By means of a planetary gear train, the power is output to the drill bit 130 at up to 80 Nm and 400 rpm. After the turbine 43, the water is conveyed through the nozzles 18 and is discharged in atomized form. Consequently, the fire extinguishing and drilling are integrated into one device. The driven drill bit The device 1 can be designed with a high-pressure turbine for up to 40 bar or with a low-pressure turbine for up to 16 bar. The market potential for high-pressure turbines, however, is declining. Whereas high pressure is used only in a few isolated provinces of Austria and a small number of fire departments in Central Europe, low pressure of up to 16 bar is a global standard. The turbine 43 is thus preferably designed as a low-pressure turbine.

Basically, it is immaterial for the turbine what input pressure is present. With a constant pressure difference, however, a sufficiently high volumetric flow is required. With their enormous resistance, though, the nozzles 18 limit the flow rate. The solution to this problem lies in the slider-controlled discharge openings 20 downstream of the turbine. Because of the cross-sectional expansion, the necessary flow rate can be achieved during drilling and the full power at the nozzles 18 can be set for the fire extinguishing.

FIGS. 10A and 10B show the slider 8 in the closed position and open position. The slider 8 controls the discharge openings 20, while the nozzles 18 remain continuously open. The support is provided with roller bearings and the turbine itself is sealed with the mechanical shaft seal 65. The gear ratio step-up at the planetary gear train 5 is adapted to the specific application.

The main intended use of the invention at this time is fire extinguishing technology. In a drill fire extinguishing system 140, the drill fire extinguishing device 1 itself has holding brackets added to it, but the drill fire extinguishing device 1 itself is always embodied the same. A holding bracket can guide the turbine on an aerial rescue apparatus such as a turntable ladder or a telescopic boom lift. For this purpose, anchor points can be used or provided on the apparatuses used. Another version is used for manual guidance of the turbine, in which case the firefighter or a person 141 in general can bring the device into position like a power drill for example on a roof (FIGS. 14A to 14C). In this case, the holding bracket 142 can be embodied as a person-based adapter for connecting to a hose 143 and can be carried, held, and handled by a person 141. The holding bracket 142 can have a tubular body 144 with a device coupling 147, which is embodied for connecting to the adapter piece 2 of the drill fire extinguishing device 1, and a flange 148, which is embodied for connecting to a mating flange 143*a* of the hose 143. The tubular body 144 can have a first grip 145, a second grip 146, and a shoulder rest 149 positioned on it. The first grip 145 can have a cuff 145*a*, which is fasted to the tubular body 144 and on which or by means of which the sleeve 47 of the tensioning means 10 can be guided. The second grip 146 can also be fastened to the tubular body 144 by means of a cuff 146*a* and can support a lever 146*b* that can be embodied for actuating the tensioning means 10. To this end, the sleeve 47 of the tensioning means 10 can be supported on a support bracket 146*c* and the cable 46 of the tensioning means 10 can be fastened to the lever 146*b*. Thus when the lever 146*b* is pulled, the slider 8 can be pulled back by means of the cable 46, whereas when the lever 146*b* is released, the slider 8 is slid forward by the action of the spring 9. The lever 146*b* can thus serve as a triggering device for the closing and switching device 22. The shoulder rest 149 in the form of a support bracket can be adapted to the shoulder shape of the person 141 and can have a universal shape that takes into account protective clothing.

Figure 15A:
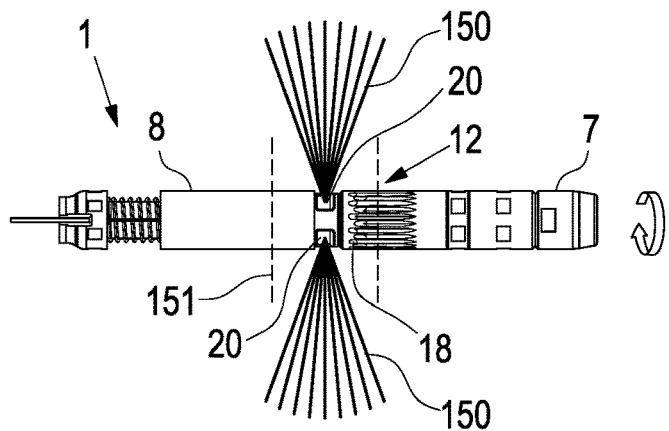
FIGS. 15A-15C: show side views of the drill fire extinguishing device from FIG. 1 in various operating modes.
Figure 15B:
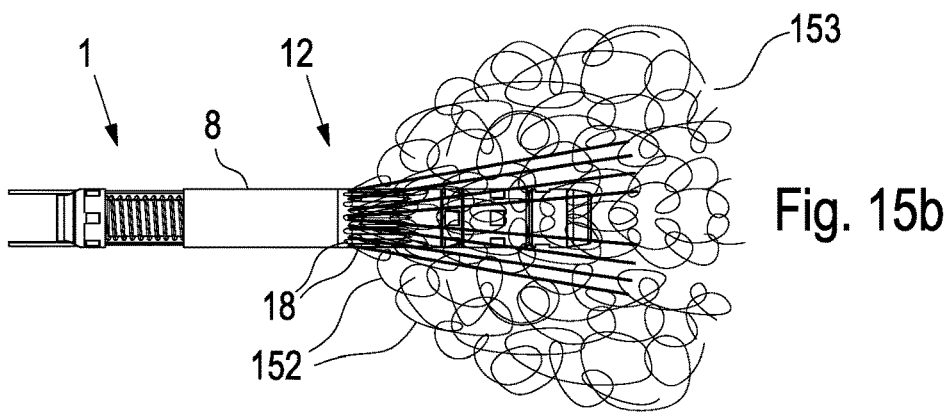
Figure 15C:
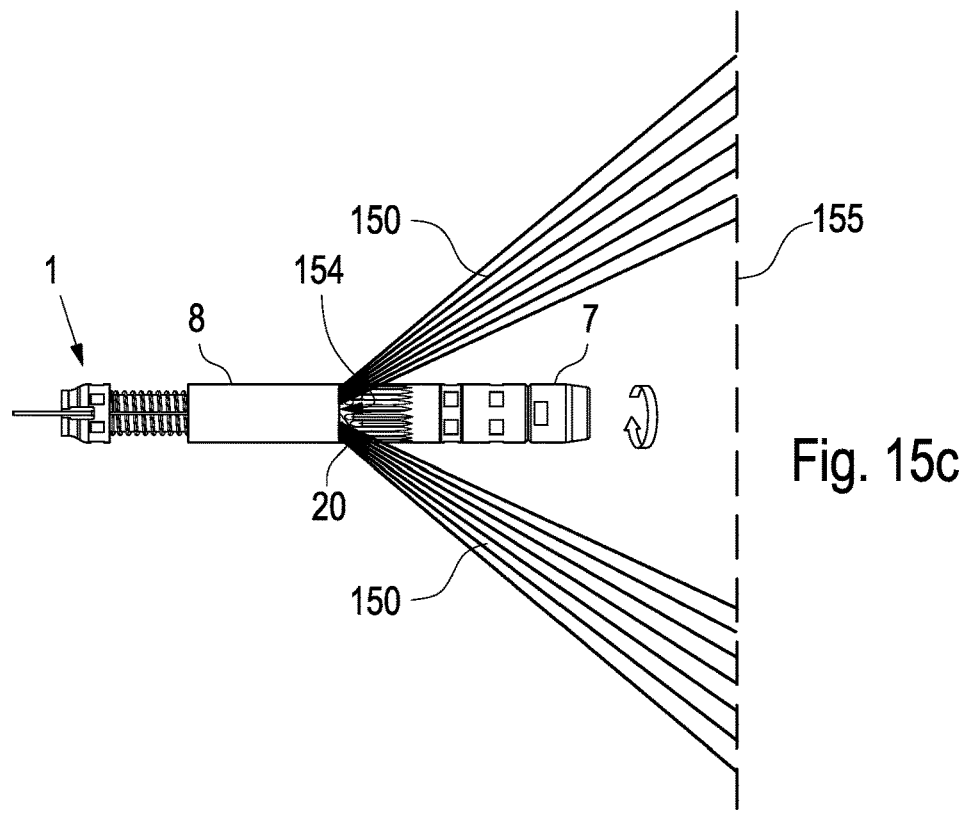

In the preceding section, a first position has been described, in which the slider 8 completely opens the discharge openings 20. In this position, which corresponds to a drive mode, the fluid is discharged from the discharge openings 20 in jets 150 that are almost completely radially oriented (FIG. 15A). The tool holder 7 rotates, driven by the turbine. Hardly any fluid is allowed to pass through the nozzles 18. The fluid jets 150 produce a fluid barrier 151 in the form of a ring or, depending on the lateral fanning-out of the jets 150, in the form of a disk, which provides effective protection even from flames, smoke, and gases that may possibly flash back from the obstacle. In addition, a second position has been described, in which the slider 8 completely covers the discharge openings 20. In this position, which corresponds to a fire extinguishing mode, the fluid is discharged from the nozzles 18 in several rings of atomized nozzle jets 152 forming a mist cloud 153 (FIG. 15B). This mist cloud 152 has a high degree of atomization and thus a large surface area, which in a known way results in a powerful fire extinguishing action by cooling due to rapid evaporation. It can also be advantageous in use if the slider 8 covers the discharge openings 20 only partially (FIG. 15C). In such an intermediate position, an edge 154 of the slider 8 deflects the jets 150 toward the front so that they form a fluid cone 155 with a high volumetric flow. This position can be particularly advantageous in use when a sudden flashback of flame from the obstacle occurs. The cone 155 that is formed can quickly and effectively repel such a flashback of flame.

Although the invention has been extensively and completely described and graphically depicted based on a currently preferred exemplary embodiment, the invention is neither limited to the described details of the exemplary embodiment nor constituted by them, but is instead defined solely by the independent claims in their respectively current wording. It will be readily apparent to the person skilled in the art that many modifications, additions, and omissions are conceivable relative to the described exemplary embodiment within the scope of the subject defined by the independent claims. Each individual feature that is described and/or depicted in this application can—individually and regardless of a design context—be added along with other features to a claimed subject in order to produce a new subject of the invention provided that it serves, individually or in combination with other features of the claimed subject, to attain a technical object. Each individual feature of a claimed subject can be omitted in order to produce a new subject of the invention provided that the new subject of the invention attains a technical object even without the omitted feature.

For example, the nozzles 18, which have been described and depicted in two rows 31, 32, can also be embodied in a different arrangement, in particular in a single row or in more than two rows, the rows can have a different offset than half the spacing of the nozzles 18 in in a row, or the nozzles 18 of different rows or within a single row can be embodied with different bore angles of the bores 60.

It should also be understood that the nozzles 18 and discharge openings 20 do not have to be embodied in the wall of the same component (in this case of the nozzle housing 4). The arrangement and embodiment of the components forming the basically tubular wall of the drill fire extinguishing device 1 can be adapted to special needs. For example, between the guide apparatus 41 and the nozzle housing 4, an additional turbine housing can be provided, which has the discharge openings 20. This makes it possible, for example, for different impeller geometries to be implemented independently of the nozzle housing 4.

In modifications, it is possible to omit the nozzles 18. In other modifications, the discharge openings 20 can be omitted. Instead of a plurality of nozzles 18 and discharge openings 20, only one nozzle 18 or one discharge opening 20 can be provided.

In one embodiment alternative, the slider 8 can be embodied so that in the drilling position, it completely or partially closes the nozzles. For this purpose, the lever 146*b* can be provided with catches, for example, which correspond to different degrees of opening and closing of the discharge openings 20. Instead of the depicted slider 8, in another embodiment alternative, it is also possible to provide a rotating collar, for example, which has windows that correspond cross-sectionally to the discharge openings 20, which by means of a mechanism can be guided in a rotary motion in order to selectively bring the windows or partitions between the windows into positions congruent with the discharge openings 20.

The drill fire extinguishing device 1 is particularly suitable for use at low pressure. In rescue services, in particular firefighting and disaster relief services, low pressure is frequently defined as being up to at most 16 bar of nominal pressure and high pressure is frequently defined as being up to at most 40 bar of nominal pressure, and devices, fittings, seals, lines, and connections are designed accordingly. In this context, a nominal pressure of PN16 means that it is not permissible to exceed a maximum operating pressure of 16 bar; the testing pressure is 25 bar and the minimum bursting pressure is 60 bar. In practice, however, even with ND16, work is performed with no more than 10 to 12 bar. The turbine itself reduces a differential pressure by approx. 2-8 bar. The hydraulic power is composed of the product of the volumetric flow and the differential pressure.

According to the Bernoulli equation in print form, assuming an equal geodetic elevation, the equilibrium can be described as follows:

$$p(\text{pump}) + \rho * C(\text{inlet})^2/2 + p(\text{atmosphere}) =$$

$$= \Delta p(\text{turbine}) + \rho * C(\text{outlet})^2/2 + p(\text{atmosphere}) + \Sigma \Delta pv$$

where
p=pressure
C=flow speed
$\rho$=density of the fluid
$\Sigma \Delta pv$=sum of all pressure losses (except turbine)

The atmospheric pressure at the inlet and outlet is equal and so this term is dropped. The flow speed at the inlet can be ignored because the pump draws from a large tank and the inlet speed is thus roughly zero. The outlet speed is still a significant portion because high speeds occur at the nozzles. What remains then is:

$$p(\text{pump}) = \Delta p(\text{turbine}) + \rho^* C(\text{outlet})^2/2 + \Sigma \Delta p$$

If the cross-section of the nozzles becomes smaller, then on the one hand, the friction becomes greater than the outlet speed and as a result, more energy is converted for the atomization.

The output pressure affects the pump capacity curve of the drive unit and thus determines the flow rate. In other words, if the pressure losses are too high to produce a particular volumetric flow at a particular operating pressure, then the turbine has too little power. For example, up to 40 bar can be required in order to produce the necessary flow rate through the nozzles if the pressure losses at the nozzle and in the hose produce a correspondingly large amount of friction.

If the discharge openings 20 and the slider 8 are used, then the cross-section can be expanded and both the speed and the friction can be massively reduced. As a result, even at low pressures of for example at most 16 bar, it is possible to ensure that the necessary flow rate is produced. The advantage of a switching device is thus produced based on the nozzle geometry and on the equilibrium between the resulting pressure loss and the flow rate, which has a retroactive effect on the pump capacity curve of the drive unit.

The turbine 40 of the exemplary embodiment can have a guide apparatus 41 and an impeller 42. In modifications, it is also possible for a plurality of stages of guide apparatuses and impellers to be provided or for a guide apparatus to be omitted.

In the exemplary embodiment, the fluid chamber 30 is formed by the guide cone 83 and the wall of the nozzle housing 4. Thanks to this arrangement, the flow path between the discharge openings 20 and the nozzles 18 can easily be switched and directed. Other design solutions are also conceivable, however. For example, the guide cone 83 could have a curved, in particular concave, contour.

The tensioning means 10 is a special embodiment of a power transmitting means. For example, it can also be embodied in the form of a rod and the triggering of a movement at the holding bracket 142 can be transmitted to the slider 8 by means of a lever mechanism instead of a Bowden cable. If the power transmitting means can be acted on by pressure, then instead of the spring 9 on the drill fire extinguishing device 1, a return mechanism can also be provided on the holding bracket 142.

In one embodiment variant, in addition to the first position in which the discharge openings 20 are opened in order to implement a drilling function of the drill fire extinguishing device (FIG. 15A) and the second position in which the discharge openings 20 are closed in order to implement a fire extinguishing or spraying function of the drill fire extinguishing device 1 (FIG. 15B), the slider 8 can also be provided with a third position in which the nozzles 18 are closed in order to block the fluid flow entirely. By means of intermediate positions, it is possible for several rings of nozzles 18 to be successively closed or opened.

Alternatively or in connection with the drilling function, a percussion mechanism can be provided, which is or can be coupled into the path of force of the turbine.

In one embodiment variant, a shut-off mechanism can be provided on the holding bracket 142 or on the drill fire extinguishing device 1 itself in order to be able to shut off an inflow of the fluid from the hose 143.

Additional paths or additional units can enable an inflow or an adding of other fluids in addition and/or alternatively to the fluid supplied via the hose 143.

The use of the turbine design is not limited to the fire extinguishing application. If the nozzle structure is removed and the jet is guided freely, then the turbine can also be used for small-scale hydroelectric power. With a return of the fluid quantity—which has been discharged through the discharge openings 20—into a casing tube, it would thus be possible to operate a powerful drilling mechanism, which can also be both cooled and flushed simultaneously. For example, the same technique can be used in mining or wherever an explosive atmosphere is to be expected. The drill fire extinguishing device can thus also be understood as a hydraulic drilling device with an extinguishing function or as a fire extinguishing device with a drilling function and the drill fire extinguishing system can also be understood as a drilling system with an extinguishing function or as a fire extinguishing device with a drilling function, where in each of these, a drive fluid can be used as a fire extinguishing fluid or a fire extinguishing fluid can be used as a drive fluid. The drill bit and the cutting insert, particularly with regard to the cutting geometry, are independent developments and can also be used for penetrating multiple materials independently of the above-described drill fire extinguishing device or drill fire extinguishing system.

LIST OF REFERENCE NUMERALS AND SYMBOLS

1 drill fire extinguishing device
2 adapter piece
3 spacer tube
4 nozzle housing
5 transmission unit
6 intermediate piece
7 drill chuck
8 slider
9 return mechanism (spring)
10 tensioning means
11 inlet opening
12 nozzle assembly
13 tool holder
14-17 wrench-engaging surface
18 nozzle (spray nozzle)
19 groove
20 discharge opening
21 set screw
22 switching device (closing device)
30 fluid chamber
31 first row of nozzles (nozzle ring)
32 second row of nozzles (nozzle ring)
40 turbine
41 guide apparatus
42 impeller
43 splining (pinion, sun gear)
45 transmission output shaft
46 cable
47 sleeve
48 end cap
50 screw connection
51 sealing ring (Teflon ring)
52 screw connection
53 fixed bearing (grooved ball bearing)
53*a* prestressing washer 54 screw connection
55 screw connection
56 grooved ball bearing
57 screw connection
58 support bearing (needle roller bearing)
59 radial shaft seal
60 bore
61 countersink
62 screw connection
63 sealing ring (O ring, Teflon ring)
64 movable bearing (needle roller bearing)
65 mechanical shaft seal
70 cage
74 flow divider
72 guide vane
73 external thread (of screw connection 52)
74 wrench-engaging surface
75 receiving space
76 inflow end
77 stagnation point
78 cavity
79 internal thread (of screw connection 62)
80 end face
81 end surface
82 vane shaft
83 guide cone
84 output shaft
85 runner blade
86 shaft stub
87 cylindrical part
88 shaft shoulder
90 shaft stub
101 first flow path
102 second flow path
110 coupling device (fluid connection)
111 end face
112 shoulder surface
113 annular surface
114 ramp surface
120 flow path
130 drill bit
131 head
132 helical groove
133 centering tip
134 end face
135 shaft
136 driving surface
140 drill fire extinguishing system
141 person
142 holding bracket (person-based adapter)
143 hose
143a flange
144 tubular body
145 first hand grip
145a cuff
146 second grip
146a cuff
146b lever
146c support bracket
147 device coupling
148 flange (hose connection)
149 shoulder rest
150 fluid jet
151 fluid barrier
152 nozzle jet
153 mist cloud
154 edge
155 fluid cone
160 cutting insert
161 flat surface
162 side surface
163 base surface
164 end face
165 centering tip
166 centering groove
167 fastening bore
170 cutting edge
171 clamping groove
172 back-off clearance
173 cutting edge
174 clamping groove
175 support surface
176 back-off clearance
177 clearing edge
178 support surface
179 back-off clearance
A1 tip angle
A2 cone angle
A3 half of tip angle
A4 grinding angle
D1 head diameter
D2 tip base diameter
H1 tip height
H2 cutting insert height
L1 overall length of drill bit
L2 shaft length
M central axis (axis of rotation)
W1 cutting insert width The foregoing list is an integral component of the description.

The invention claimed is:

1. A drill fire extinguishing device (1) comprising:
a tool holder (13) configured to hold a tool or be connected to a tool;
a fluid connection (110) configured to supply a fluid;
a turbine (40) including an impeller (42) having at least one stage with a plurality of runner blades (85) and connectable to the tool holder (13) to drive the tool holder (13) in a drive mode in a rotary and/or percussive fashion using the fluid supplied via the fluid connection (110);
at least one discharge opening (20) in a stationary wall (4) of the drill fire extinguishing device (1) in fluid communication with a fluid chamber (30) downstream of the runner blades (85) of the turbine (40), the discharge opening (20) providing a first flow path (101) to dispense the fluid to a) an area surrounding the drill fire extinguishing device (1);
a nozzle assembly (12) having one or more nozzles (18) positioned in the stationary wall (4) of the drill fire extinguishing device (1) in fluid communication with the fluid chamber (30) downstream of the runner blades (85) of the turbine (40) to form a second flow path (102), so that after the fluid exits the turbine (40), it is discharged as fire extinguishing fluid into the area surrounding the drill fire extinguishing device (1), wherein the nozzles (18) comprise spray nozzles configured to produce a fine spray mist and the nozzle assembly (12) includes at least two groups of nozzles (18) which have different outlet angles from each other; and
a retractable slider (8) having a first position in which the slider (8) is pulled back to expose the at least one discharge opening (20) and a second position in which the slider (8) is moved forward to cover the at least one discharge opening (20);

wherein the turbine (40) is an axial turbine or tubular turbine and the fluid connection (110) provides an axial inflow of the fluid into the drill fire extinguishing device (1).

2. The drill fire extinguishing device according to claim 1, wherein the runner blades (85) of the axial turbine or tubular turbine have a NACA airfoil profile.

3. The drill fire extinguishing device according to claim 1, wherein the turbine (40) further comprises a stationary guide apparatus (41) including a plurality of guide vanes (72) upstream of a stage of the runner blades (85), the guide vanes (72) are connected to or formed in the stationary wall (4) of the drill fire extinguishing device (1), and the guide vanes (71) and/or the runner blades (85) have a NACA airfoil profile.

4. The drill fire extinguishing device according to claim 3, wherein the turbine (40) further comprises a central, conical inflow end (76) configured to convey fluid flow from the fluid connection (110) to an annular conduit formed by the impeller (42) and a wall (4) of the turbine (40) or drill fire extinguishing device (1), or to an annular conduit of the stationary guide apparatus (41).

5. The drill fire extinguishing device according to claim 1, wherein the turbine (40) is designed for an excess pressure of the fluid of up to 16 bar between the fluid connection (110) and the surrounding area.

6. The drill fire extinguishing device according to claim 1, further comprising a deflecting device positioned on an output shaft (84) of the turbine (40), configured to deflect a fluid flow coming from the turbine (40) to the at least one discharge opening (20) and forming a front end of the fluid chamber (30).

7. The drill fire extinguishing device according to claim 1, wherein the drill fire extinguishing device (1) has an approximately tubular shape, the fluid connection (110) is positioned at a rear end of the drill fire extinguishing device (1), and the tool holder (13) is positioned at a front end of the drill fire extinguishing device (1).

8. The drill fire extinguishing device according to claim 1, wherein the at least one discharge opening (20) is configured so that fluid from the turbine (40) is dispensed primarily in a radial direction into the area surrounding the drill fire extinguishing device (1).

9. The drill fire extinguishing device according to claim 1, further comprising a closing device (22) including the retractable slider (8), wherein the retractable slider (8) is tubular and selectively opens or closes the at least one discharge opening (20).

10. The drill fire extinguishing device according to claim 9, wherein the closing device (22) further comprises a spring (9) that prestresses the slider (8) in a closing direction.

11. The drill fire extinguishing device according to claim 9, wherein the closing device (22) further comprises a tensioning cable which acts on the slider (8) in an opening direction.

12. The drill fire extinguishing device according to claim 1, further comprising a step-down transmission (5) between an output shaft (84) of the turbine (40) and the tool holder (13).

13. The drill fire extinguishing device according to claim 12, wherein the step-down transmission (5) comprises a plurality of step-up gears or step-down gears.

14. The drill fire extinguishing device according to claim 1, further comprising screw connections (50, 52, 54, 55, 57, 62) for connecting axially adjacent portions of the drill fire extinguishing device, and the screw connections (50, 52, 54, 55, 57, 62) each include an internal thread in the stationary wall (4) and an external thread.

15. The drill fire extinguishing device according to claim 1, wherein the nozzles (18) comprise oblique bores (60) that are directed obliquely toward a front of the wall (4) of the drill fire extinguishing device (1).

16. The drill fire extinguishing device according to claim 1, wherein an outer surface of the drill fire extinguishing device (1) comprises axial grooves (19) which extend from outlet openings of the nozzles (18) toward a front end of the drill fire extinguishing device (1).

17. The drill fire extinguishing device according to claim 1, wherein the nozzle assembly (12) comprises at least two groups of nozzles (18) which open in an annular fashion and are distributed over a circumference of the drill fire extinguishing device (1), and each group of nozzles (18) is circumferentially or axially positioned relative to each other group of nozzles (18).

18. The drill fire extinguishing device according to claim 1, further comprising a switching device (22) for switching a flow path of the fluid between a first position that opens the first flow path (101) and corresponds to a drilling mode and a second position that closes the first flow path (101) and corresponds to a fire extinguishing mode.

19. The drill fire extinguishing device according to claim 18, wherein the switching device (22) includes the retractable slider (8) that selectively opens or closes the at least one discharge opening (20).

20. The drill fire extinguishing device according to claim 18, wherein the nozzles (18) communicate with the fluid chamber (30) in both the first and second position of the switching device.

21. The drill fire extinguishing device according to claim 1, wherein the first flow path (101) has a narrowest point and a first flow path cross-section at its narrowest point; the second flow path (102) has a narrowest point of all the nozzles (18) and a cumulative second flow path flow path cross-section at the narrowest point of all the nozzles (18); and the first flow path cross-section at its narrowest point is larger than the cumulative second flow path cross-section at the narrowest point of all the nozzles (18), or the first flow path has a flow resistance that is lower than a cumulative flow resistance of the second flow path (102) through all of the nozzles (18).

22. A drill fire extinguishing device (1) comprising: a tool holder (13) configured to hold a tool or be connected to a tool; a fluid connection (110) configured to supply a fluid; a turbine (40) including an impeller (42) having at least one stage with a plurality of runner blades (85) and connectable to the tool holder (13) to drive the tool holder (13) in a drive mode in a rotary and/or percussive fashion using the fluid supplied via the fluid connection (110); at least one discharge opening (20) in a stationary wall (4) of the drill fire extinguishing device (1) in fluid communication with a fluid chamber (30) downstream of the runner blades (85) of the turbine (40), the discharge opening (20) providing a first flow path (101) to dispense the fluid to a) an area surrounding the drill fire extinguishing device (1); a nozzle assembly (12) having one or more nozzles (18) positioned in the stationary wall (4) of the drill fire extinguishing device (1) in fluid communication with the fluid chamber (30) downstream of the runner blades (85) of the turbine (40) to form a second flow path (102), so that after the fluid exits the turbine (40), it is discharged as fire extinguishing fluid into the area surrounding the drill fire extinguishing device (1), wherein the nozzles (18) comprise spray nozzles configured to produce a fine spray; and a retractable slider (8) having a first position in which the slider (8) is pulled back to expose the at least one discharge opening (20) and a second position in which the slider (8) is moved forward to cover the at least one discharge opening (20); wherein the turbine (40) is an axial turbine or tubular turbine and the fluid connection (110) provides an axial inflow of the fluid into the drill fire extinguishing device (1);and the first flow path (101) has a narrowest point and a first flow path cross-section at its narrowest point; the second flow path (102) has a narrowest point of all the nozzles (18) and a cumulative second flow path flow path cross-section at the narrowest point of all the nozzles (18); and the first flow path cross-section at its narrowest point is larger than the cumulative second flow path cross-section at the narrowest point of all the nozzles (18), or the first flow path has a flow resistance that is lower than a cumulative flow resistance of the second flow path (102) through all of the nozzles (18).

* * * * *